(12) United States Patent
Joshi et al.

(10) Patent No.: US 7,900,206 B1
(45) Date of Patent: Mar. 1, 2011

(54) INFORMATION TECHNOLOGY PROCESS WORKFLOW FOR DATA CENTERS

(75) Inventors: Darshan B. Joshi, Fremont, CA (US);
James A. Senicka, Hampton, VA (US);
Kaushal R. Dalal, Sunnyvale, CA (US);
Roger H. Davis, Jr., Chattanooga, TN (US)

(73) Assignee: Symantec Operating Corporation, Mountain View, CA (US)

( * ) Notice: Subject to any disclaimer, the term of this patent is extended or adjusted under 35 U.S.C. 154(b) by 1084 days.

(21) Appl. No.: 10/815,126

(22) Filed: Mar. 31, 2004

(51) Int. Cl.
*G06F 9/46* (2006.01)
*G06F 15/173* (2006.01)
*G06F 11/00* (2006.01)

(52) U.S. Cl. ......... 718/104; 718/100; 718/105; 709/223; 709/224; 709/226; 714/4; 714/47; 714/48

(58) Field of Classification Search .............. 718/1–108; 709/223, 224, 226, 230, 231; 714/2, 47, 714/48, 49, 4, 1
See application file for complete search history.

(56) References Cited

U.S. PATENT DOCUMENTS

| | | | | |
|---|---|---|---|---|
| 5,239,649 A | 8/1993 | McBride et al. | ............... | 718/105 |
| 5,442,791 A | 8/1995 | Wrabetz et al. | ............... | 395/650 |
| 5,680,610 A | 10/1997 | Smith et al. | ............... | 1/1 |
| 5,958,070 A | 9/1999 | Stiffler | ............... | 714/13 |
| 6,088,727 A | 7/2000 | Hosokawa et al. | ............ | 709/223 |
| 6,101,508 A | 8/2000 | Wolff | ............... | 709/223 |
| 6,128,657 A | 10/2000 | Okanoya et al. | ............... | 709/224 |
| 6,145,089 A | 11/2000 | Le et al. | ............... | 714/4 |
| 6,173,306 B1 | 1/2001 | Raz et al. | ............... | 718/102 |
| 6,178,529 B1 * | 1/2001 | Short et al. | ............... | 714/51 |
| 6,212,562 B1 * | 4/2001 | Huang | ............... | 709/227 |
| 6,243,825 B1 | 6/2001 | Gamache et al. | ............... | 714/4 |
| 6,366,945 B1 * | 4/2002 | Fong et al. | ............... | 718/104 |
| 6,393,485 B1 * | 5/2002 | Chao et al. | ............... | 709/231 |

(Continued)

FOREIGN PATENT DOCUMENTS

JP HEI 09-231019 9/1997

OTHER PUBLICATIONS

Epema, D.H.J., Livny, M., Dantzig, R. van, Evers, X., Pruyne, J., *A Worldwide Flock of Condors: Load Sharing Among Workstation Clusters*, Future Generations Computer Systems, vol. 12, No. 1, May 1, 1996, pp. 53-65.

(Continued)

*Primary Examiner* — Li B Zhen
*Assistant Examiner* — Abdullah Al Kawsar
(74) *Attorney, Agent, or Firm* — Campbell Stephenson, LLP

(57) ABSTRACT

A method, system, computer system, and computer program product that use application requirements, business priorities, and compatibility and dependency among applications to allocate resources among those applications in a clustering environment. A workload policy engine is aware of the resources available within each cluster, as well as the capacities of those resources. Multiple instances of the workload policy engine can be run in different clusters. The workload policy engine can be used in conjunction with disaster recovery products as well as with provisioning software so that new machines can be provisioned in and out of a cluster dynamically, such as in a blade environment. Furthermore, the workload policy engine can be used in conjunction with dynamic repartitioning capabilities provided by different hardware platforms for large computer systems, as well as with performance monitoring software.

29 Claims, 18 Drawing Sheets

U.S. PATENT DOCUMENTS

| | | | |
|---|---|---|---|
| 6,430,570 B1 | 8/2002 | Judge et al. | 717/166 |
| 6,438,705 B1 * | 8/2002 | Chao et al. | 714/4 |
| 6,449,733 B1 * | 9/2002 | Bartlett et al. | 714/13 |
| 6,496,823 B2 | 12/2002 | Blank et al. | 1/1 |
| 6,553,401 B1 | 4/2003 | Carter et al. | 709/200 |
| 6,594,784 B1 | 7/2003 | Harper et al. | 714/47 |
| 6,662,219 B1 | 12/2003 | Nishanov et al. | 709/220 |
| 6,694,370 B1 | 2/2004 | Bischof et al. | 709/229 |
| 6,701,453 B2 | 3/2004 | Chrabaszcz | 714/13 |
| 6,711,616 B1 | 3/2004 | Stamm et al. | 709/226 |
| 6,799,208 B1 | 9/2004 | Sankaranarayan | 709/223 |
| 6,823,382 B2 | 11/2004 | Stone | 709/224 |
| 6,874,145 B1 | 3/2005 | Ye et al. | 718/108 |
| 6,922,791 B2 * | 7/2005 | Mashayekhi et al. | 714/4 |
| 6,934,880 B2 | 8/2005 | Hofner | 714/10 |
| 6,963,917 B1 | 11/2005 | Callis et al. | 709/227 |
| 6,986,042 B2 | 1/2006 | Griffin | 713/164 |
| 6,990,606 B2 * | 1/2006 | Schroiff et al. | 714/7 |
| 6,996,728 B2 | 2/2006 | Singh | 713/300 |
| 7,058,846 B1 * | 6/2006 | Kelkar et al. | 714/4 |
| 7,076,783 B1 | 7/2006 | Frank et al. | 719/313 |
| 7,096,248 B2 * | 8/2006 | Masters et al. | 709/201 |
| 7,281,154 B2 | 10/2007 | Mashayekhi et al. | 714/4 |
| 7,308,687 B2 * | 12/2007 | Trossman et al. | 718/104 |
| 7,316,020 B2 * | 1/2008 | Raja et al. | 718/104 |
| 7,392,421 B1 | 6/2008 | Bloomstein et al. | 714/4 |
| 7,448,079 B2 | 11/2008 | Tremain | 726/14 |
| 7,451,450 B2 * | 11/2008 | Sankaranarayan et al. | 718/104 |
| 7,464,378 B1 * | 12/2008 | Limaye et al. | 718/100 |
| 7,478,149 B2 * | 1/2009 | Joshi et al. | 709/223 |
| 7,502,823 B2 | 3/2009 | Garg et al. | 709/203 |
| 7,529,822 B2 * | 5/2009 | Joshi et al. | 709/223 |
| 7,647,592 B2 | 1/2010 | Sauermann | 718/105 |
| 2001/0003831 A1 | 6/2001 | Boland | 709/226 |
| 2002/0147966 A1 | 10/2002 | Frazier | 717/127 |
| 2004/0049579 A1 | 3/2004 | Ims et al. | 709/225 |
| 2004/0205414 A1 * | 10/2004 | Roselli et al. | 714/39 |
| 2005/0050544 A1 | 3/2005 | Saito et al. | 718/103 |
| 2005/0138517 A1 * | 6/2005 | Monitzer | 714/746 |
| 2005/0177832 A1 | 8/2005 | Chew | 718/104 |
| 2006/0036896 A1 | 2/2006 | Gamache et al. | 714/4 |
| 2006/0059492 A1 | 3/2006 | Fellenstein et al. | 718/104 |
| 2006/0248372 A1 | 11/2006 | Aggarwal | 714/4 |

OTHER PUBLICATIONS

Mao, Zhuoging Morley and Katz, Randy, *Achieving Service Portability in ICEBERG*, Service Portability and Virtual Customer Environments, 2000 IEEE, pp. 20-28.

Communication from Japanese Patent Office for Japanese Application No. P2004-509790 dated Sep. 30, 2008, 3 pages.

WO 2003/102772 A3, International Search Report 5 pages, Sep. 2, 2004.

* cited by examiner

Cluster Environment

Cluster

Cluster Appliance

Initial State

After Failure of Node N1

After Failure of Nodes N1 and N2

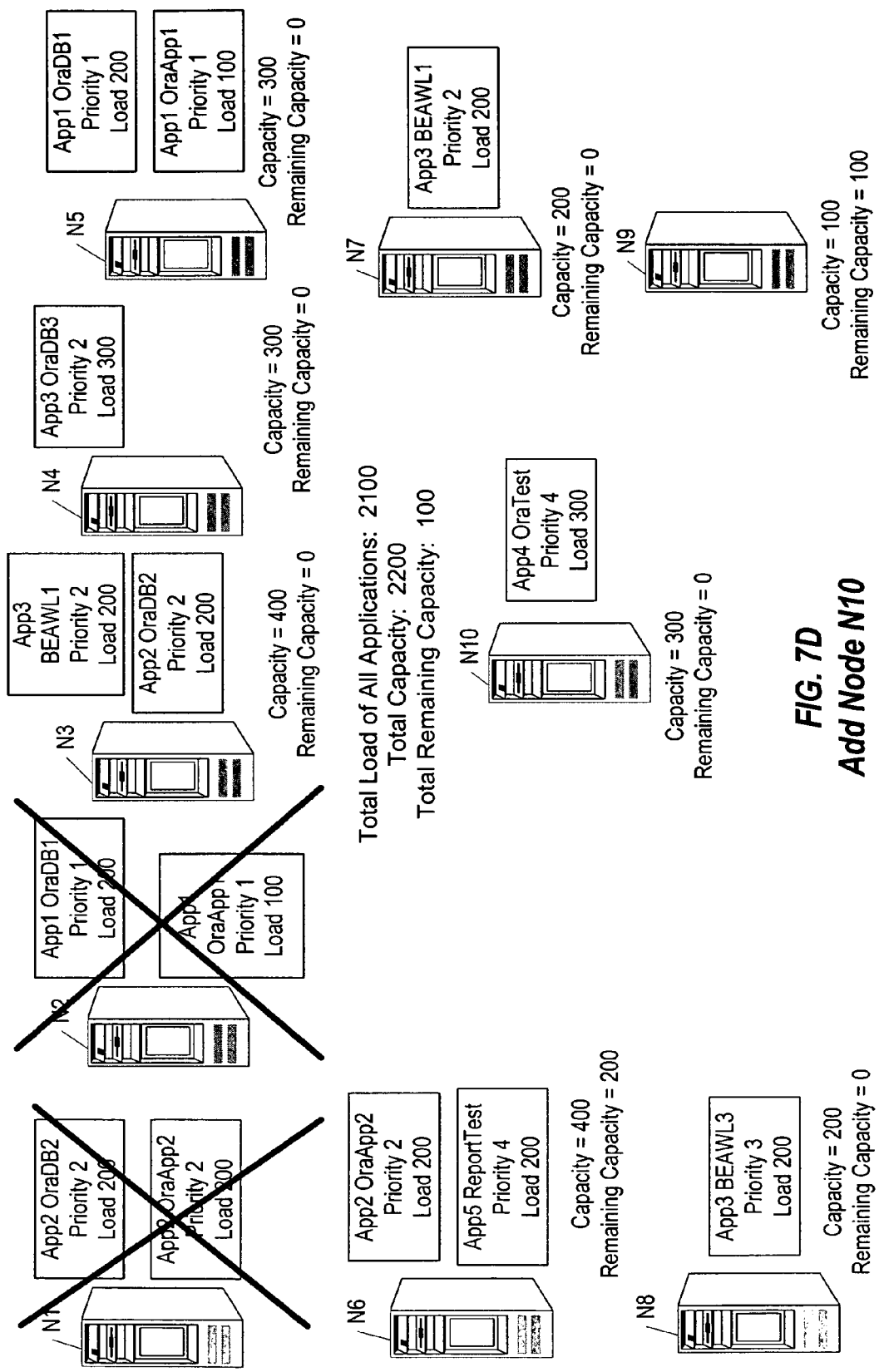

Initial State

Migrate Application due to Performance Problems

Second Migration of Application due to Performance Problems

Remove Server and Add New Server

Initial State

Failover to Another Cluster

Initial State

Re-partition

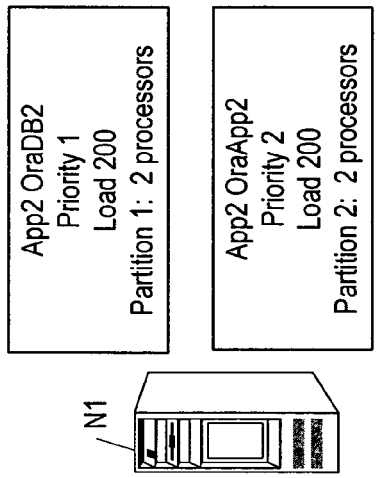
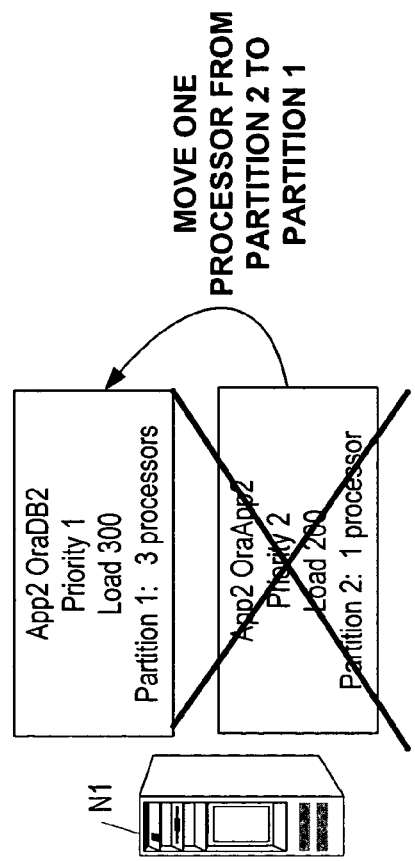
FIG. 11A Initial State
FIG. 11B Re-partition

INFORMATION TECHNOLOGY PROCESS WORKFLOW FOR DATA CENTERS

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

As the use of open systems grows, managing data centers that may have hundreds or thousands of computer systems becomes an increasingly difficult task. Many data centers support large numbers of heterogeneous computer systems, running different operating systems and connected to a variety of networks, such as Storage Area Networks (SANs) and Internet Protocol (IP) networks. Many information technology (IT) managers are working to move from large numbers of small open systems, many running well below their capacities, to a much smaller number of large-scale enterprise servers running at or near their capacities. This trend in the IT industry is called "server consolidation."

Computer systems in a data center may include large mainframe computers and/or very large servers, such as Hewlett-Packard's Superdome and Sun's Enterprise 10,000 (E10K), providing mainframe-like power using various physical and logical partitioning schemes. Such powerful machines enable server consolidation to be "scaled up" to a small number of powerful servers.

Data centers may also include servers that are symmetric multi-processor (SMP) systems, uniprocessor (UP) systems, and/or blade servers, which include a large number of blades (thin computer cards with one or more microprocessors and memory) that typically share a housing and a common bus. Blade servers enable server consolidation to be "scaled out," so that the blade server becomes a "compute node" to which blade microprocessors can be allocated upon demand. Similarly, "virtual machines" enable computing power or memory to be provided by a number of processors which are called upon when needed.

Furthermore, the computer systems in a data center may support hundreds of application programs, also referred to as applications. These applications typically have different hardware resource requirements and business priorities, and one application may depend upon other applications. Each of these applications can have respective performance requirements, availability requirements, and disaster recovery requirements. Some application programs may run as batch jobs and have timing constraints (e.g., a batch job computing the price of bonds at a financial firm may need to end an hour before the next trading day begins). Other applications may operate best when resources are allocated as needed, such as stateless web servers and shared disk database applications. Single instance applications may run best on a single large machine with dynamic reconfiguration capabilities.

One early answer to the demand for increased application availability was to provide one-to-one backups for each server running a critical application. When the critical application failed at the primary server, the application was "failed over" (restarted) on the backup server. However, this solution was very expensive and wasted resources, as the backup servers sat idle. Furthermore, the solution could not handle cascading failure of both the primary and backup servers.

Enterprises require the ability to withstand multiple cascading failures, as well as the ability to take some servers offline for maintenance while maintaining adequate redundancy in the server cluster. Clusters of servers became commonplace, with either one server or multiple servers serving as potential failover nodes. Examples of commercially available cluster management applications include, VERITAS® Cluster Server, Hewlett-Packard® MC/Service Guard, and Microsoft® Cluster Server (MSCS).

N+1 clustering refers to multiple servers, each typically running one application, plus one additional server acting as a "spare." When a server fails, the application restarts on the "spare" server. When the original server is repaired, the original server becomes the spare server. In this configuration, there is no longer a need for a second application outage to put the service group back on the "primary node". Any server can provide redundancy for any other server. Such a configuration allows for clusters having eight or more nodes with one spare server.

N-to-N clustering refers to multiple application groups running on multiple servers, with each application group being capable of failing over to different servers in the cluster. For example, a four-node cluster of servers could support three critical database instances. Upon failure of any of the four nodes, each of the three instances can run on a respective server of the three remaining servers, without overloading one of the three remaining servers. N-to-N clustering expands the concept of a cluster having one backup server to a requirement for "backup capacity" within the servers forming the cluster.

N+1 and N-to-N clustering, however, provide only limited support should multiple servers fail, as there is no generally available method to determine which applications should be allowed to continue to run, and which applications should be shut down to preserve performance of more critical applications. This problem is exacerbated in a disaster recovery (DR) situation. If an entire cluster or site fails, high priority applications from the failed cluster or site can be started on the DR site, co-existing with applications already running at the DR site. What is needed is a process for managing information technology that enables enterprise applications to survive multiple failures in accordance with business priorities. An enterprise administrator should be able to define resources, machine characteristics, application requirements, application dependencies, business priorities, load requirements, and other such variables once, rather than several times in different systems that are not integrated. Preferably, resource management software should operate to ensure that high priority applications are continuously available.

SUMMARY OF THE INVENTION

The present invention relates to a method, system and computer program product that manages information technology resources in accordance with business priorities. Application needs for availability, disaster recovery, and performance are taken into account when allocating resources in an environment having one or more clusters. When an application is started, restarted upon failure, or moved due to an overload situation, resources best fulfilling the requirements for running the application are allocated to the application. Respective priorities of applications can be used to determine whether a lower-priority application can be moved or even halted to free resources for running a higher-priority application.

Resources in a cluster are allocated in response to failure of an application, starting the application, and/or identifying a problem with performance of the application. A particular application may be selected to receive allocated resources in accordance with the application's business priority. If existing resources in the cluster cannot be allocated to provide the quantity of resources needed by the application, the cluster can be reconfigured to enable the cluster to provide the quantity of the resources to the application. Alternatively, if existing resources in the cluster are insufficient, the application can be restarted in another cluster having sufficient resources for the application. This other cluster can be located remotely from the cluster in which the resources are needed. Reconfiguring the cluster can include adding a resource to the cluster or partitioning a resource within the cluster. In one embodiment, performance of applications running in the cluster may be monitored. If performance of one of the applications fails to satisfy a criterion, an additional quantity of the resources for the one application can be requested to enable the performance of the one application to satisfy the criterion.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings.

FIGS. 7A through 7D show an example allocation of resources in the environment of FIG. 6.

FIG. 7A shows an initial state of the environment of FIG. 6.

FIG. 7B shows a state following failure of a node of FIG. 7A and the redistribution of applications that were previously running on the failed node.

FIG. 7C shows a state following failure of a second node shown in FIG. 7B and the redistribution of applications that were previously running on each node.

FIG. 7D shows a state following addition of a server to the environment of FIG. 7C.

FIG. 8A shows another initial state of the environment of FIG. 6.

FIG. 8B shows a state following migration of an application from one node to another in FIG. 8A for performance reasons.

FIG. 8C shows a state following migration of another application from the same node as in FIG. 8B for performance reasons.

FIG. 8D shows a state following removal of the node from which applications were migrated in FIGS. 8B and 8C and after addition of a server to the environment of FIG. 8C.

FIG. 11A shows another example of allocation of processors between two applications running on a single node.

FIG. 11B shows the processors of FIG. 11A after re-partitioning the node and terminating one of the applications.

The use of the same reference symbols in different drawings indicates similar or identical items.

DETAILED DESCRIPTION

The present invention provides a comprehensive cluster workload policy engine. Resources are allocated among applications in a clustering environment using application requirements, business priorities, and compatibility and dependency among applications. The workload policy engine is aware of the resources available within each cluster, as well as the capacities of those resources. Multiple instances of the workload policy engine can run on multiple clusters, and applications can be failed over from one cluster to another. The workload policy engine can be used in conjunction with disaster recovery products as well as with provisioning software so that new machines can be provisioned in and out of a cluster dynamically, such as in a blade environment. Furthermore, the workload policy engine can be used in conjunction with dynamic repartitioning capabilities provided by different hardware platforms for large computer systems such as Hewlett-Packard's Superdome and Sun's Enterprise 10,000 (E10K).

The workload policy engine can also be integrated with resource managers, such as Sun Solaris Resource Manager or Aurema Resource Manager, to enforce resource usage rules. In addition, the workload policy engine can be used with performance management systems to solve problems that can be corrected by providing more capacity to an application. The workload policy engine can be used in a heterogeneous environment and allows multiple hardware types within a single cluster. A tight environment that connects each node in a cluster via a private network is supported, as is a loose environment that includes nodes connected only by a TCP/IP connection to the cluster.

Figure 1:
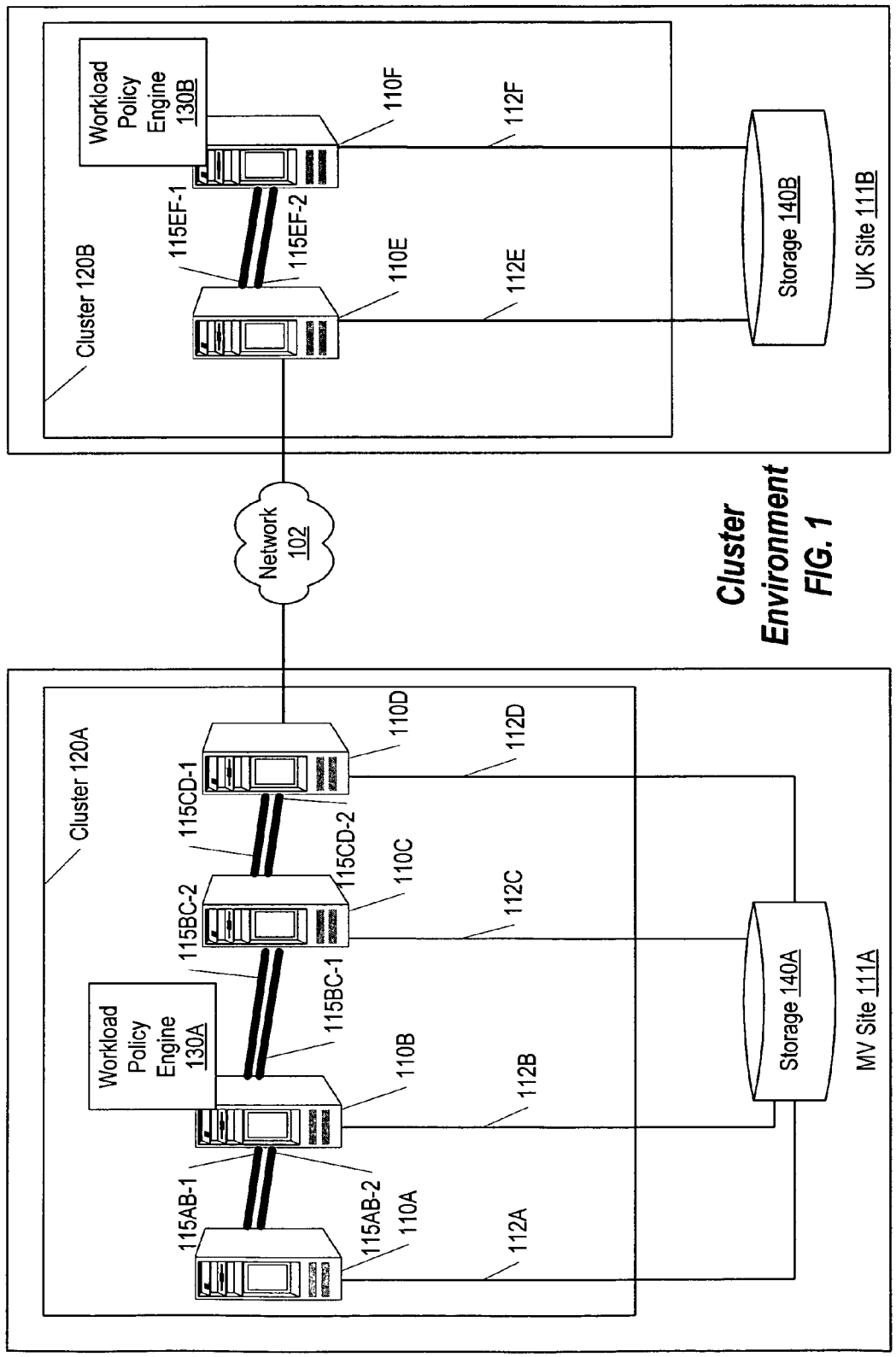
FIG. 1 provides an example of an environment in which the workload policy engine of the present invention operates.

FIG. 1 provides an example of a clustering environment in which the workload policy engine of the present invention operates. Nodes 110A, 110B, 110C and 110D at Mountain View (MV) site 111A and nodes 110E and 110F at United Kingdom (UK) site 111B are shown for purposes of illustration. The invention is not limited to minimum or maximum numbers of nodes and/or sites. While typically the term "site" describes a collection of nodes concentrated at a data center or on a campus such that cables can interconnect the nodes and storage devices, geographic concentration is not a requirement for a site. A site can include one or more clusters of nodes and can be viewed as a virtual collection of one or more clusters.

MV site 111A and UK site 111B are shown as connected via network 102, which typically corresponds to a private wide area network or a public distribution network such as the Internet. MV site 111A includes cluster 120A containing nodes 110A through 110D, which are connected via redundant cluster connections 115AB-1 and 115AB-2, 115BC-1, 115BC-2, 115CD-1, and 115CD-2. All four nodes 110A, 110B, 110C, and 110D share common storage 140A, with respective interconnections 112A, 112B, 112C, and 112D to storage 140A. Node 110B is shown as the host for workload policy engine 130A, which controls resource allocation and workload for running applications on nodes 110A through 110D in cluster 120A.

Similarly, cluster 120B at UK site 110B includes nodes 110E and 110F, which are connected via redundant cluster connections 115EF-1 and 115EF-2. Node 110E shares common storage 140B with node 110F. Node 110E is interconnected with storage 140B via interconnection 112E and node 110F is interconnected with storage 140B via interconnection 112F. Node 110F is shown as the host for workload policy engine 130B, which controls resource allocation and workload for running applications on nodes 110E and 110F in cluster 120B.

Factors included in the determination of the "best" server to initially start or to re-start an application include server capacity and finite resource availability. One technique for allocating resources in a server consolidation environment is described in U.S. patent application Ser. No. 10/609,363, entitled "Business Continuation Policy for Server Consolidation Environment," filed May 31, 2002, and naming as inventors Darshan B. Joshi, Kaushal R. Dalal, and James A. Senicka, the application being incorporated by reference herein in its entirety for all purposes.

Figure 2:
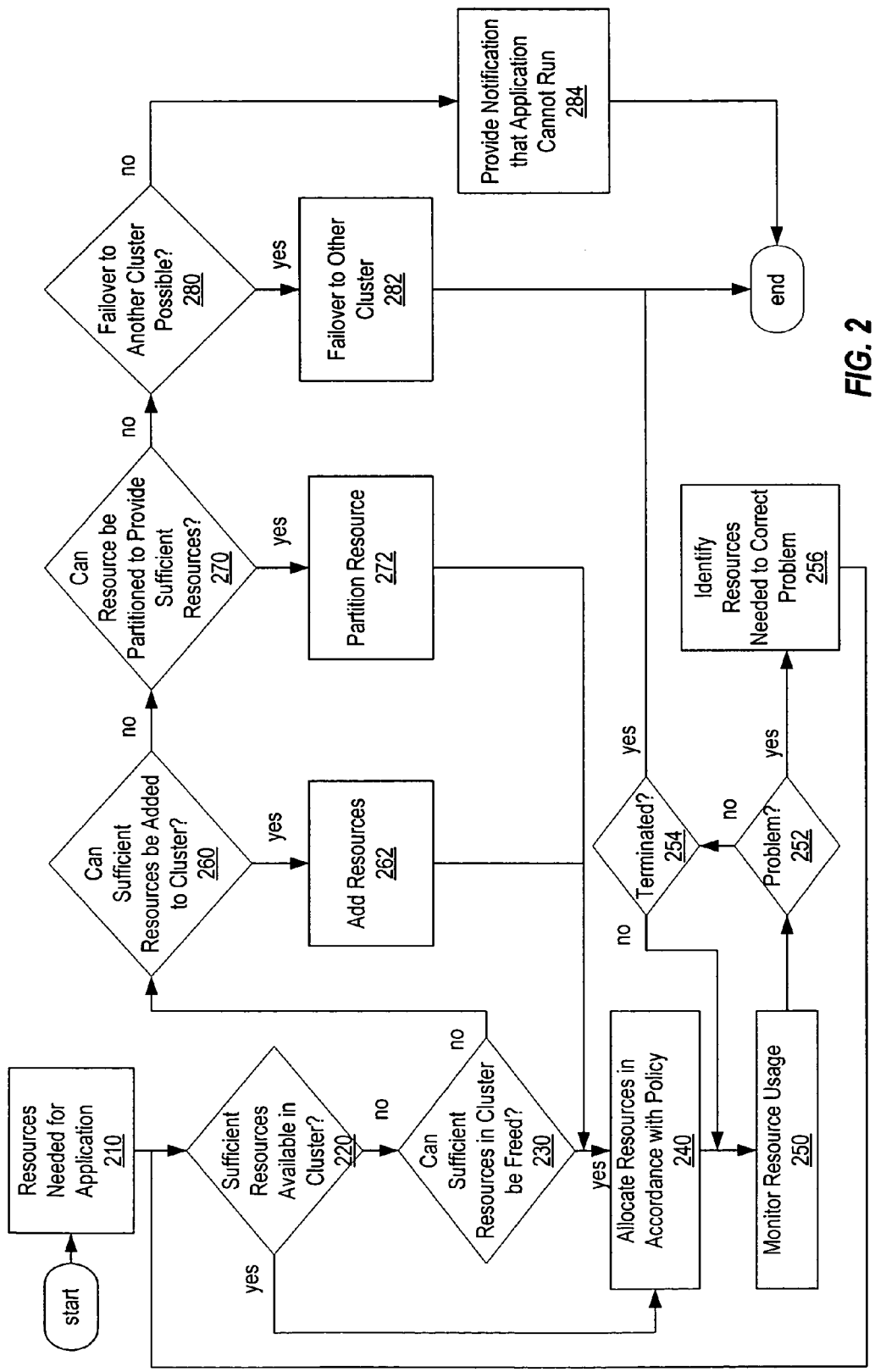
FIG. 2 is a flowchart of one embodiment of a method for managing information technology process workflow in a data center.

FIG. 2 is a flowchart of a method for managing information technology process workflow in a data center. This method may be performed, for example, by a workload policy engine such as workload policy engines 130A and 130B of FIG. 1. Management of an application and of resources used by the application begins upon either starting the application or upon failure of the application/job (or failure of the node or site hosting the application) in "Resources Needed for Application" step 210. The application may be started, for example, by a user or automatically upon starting the server hosting the application. If the application is initiated by a user, a check may be made to determine whether the user is authorized to initiate the application.

At "Sufficient Resources Available in Cluster" decision point 220, a determination is made whether sufficient resources are available within the cluster to host the application. Part of the determination of whether sufficient resources are available involves taking into account the compatibility of the application needing resources with other applications running on a given node. If the applications are compatible, then the capacity of the resources available is considered.

If sufficient resources are not available, control proceeds to "Can Sufficient Resources in Cluster be Freed" decision point 230, where a determination is made whether resources in the cluster can be freed to enable the application to obtain the resources needed to run. One technique for freeing resources using relative business priorities assigned to applications is described in U.S. patent application Ser. No. 10/609,363 referenced above.

At "Sufficient Resources Available in Cluster" decision point 220, if sufficient resources are available within the cluster to start the application, control proceeds to "Allocate Resources in Accordance with Policy" step 240. The resources are allocated to the application in accordance with business policies, application priorities, and application requirements. As noted above, the compatibility of applications is taken into account in allocating resources. In some instances, lower-priority applications may be shut down to provide resources to higher-priority applications.

From "Allocate Resources in Accordance with Policy" step 240, control proceeds to "Monitor Resource Usage" step 250. The application's use of resources is monitored to ensure that the application continues to conform to policy and meet performance requirements as long as the application is running. Control cycles through "Problem" decision point 252 and "Terminated" decision point 254 until the application is terminated or a problem is detected. If the application is terminated, monitoring of resources used by the application ceases. Resource monitoring is discussed in further detail below.

If a problem is detected at "Problem" decision point 252, control proceeds to "Identify Resources Needed to Correct Problem" step 256. The resources needed to correct the problem are identified. Control then returns to "Sufficient Resources Available in Cluster" decision point 220 to determine whether the resources needed to correct the performance problem are available within the cluster.

At "Can Sufficient Resources in Cluster be Freed" decision point 230, if sufficient resources in the cluster cannot be freed, control proceeds to "Can Sufficient Resources be Added to Cluster" decision point 260. If sufficient resources can be added to the cluster, control proceeds to "Add Resources" step 262, where additional resources are added to the cluster. For example, a node may be added by reconfiguring the cluster. A new computer system to serve as a new node may be added to the cluster, or an additional instance of an operating system may be started on a processor that can support multiple instances of operating systems to provide another node. Control proceeds from "Add Resources" step 262 to "Allocate Resources in Accordance with Policy" step 240.

At "Can Sufficient Resources be Added to Cluster" decision point 260, if sufficient resources cannot be added to the cluster, control proceeds to "Can Resource be Partitioned to Provide Sufficient Resources" step 270. If a resource can be dynamically partitioned so that the application has sufficient resources to run, control proceeds to "Partition Resource" step 272. For example, a 64 CPU machine may be partitioned initially into 4 machines, each with 16 CPUs. If an application needs additional CPUs, it may be possible to re-partition the 64 CPUs into two 32 CPU machines. After partitioning, the cluster size remains the same, but the organization of processors may vary. From "Partition Resource" step 272, control proceeds to "Allocate Resources in Accordance with Policy" step 240. If a resource cannot be partitioned to meet the needs of the application, control proceeds to "Failover to Another Cluster Possible" decision point 280.

At "Failover to Another Cluster Possible" decision point 280, if the application can be failed over to another cluster, control proceeds to "Failover to Other Cluster" step 282. The application begins at step "Resources Needed for Application" step 210 on the other cluster and follows the steps described herein.

At "Failover to Another Cluster Possible" decision point 280, if the application cannot be failed over to another cluster, control proceeds to "Provide Notification that Application Cannot Run" step 284. An administrator can be notified to intervene and restart the application.

One of skill in the art will recognize that the order of the decisions made at "Can Sufficient Resources in Cluster be Freed" decision point 230, "Can Sufficient Resources be Added to Cluster" decision point 260, "Can Resource be Partitioned to Provide Sufficient Resources" step 270, and "Failover to Another Cluster Possible" decision point 280 can be varied without departing from the scope of the invention.

Furthermore, not all options may be needed by a given organization and thus all of these steps are not necessary to practice the invention.

Figure 3:
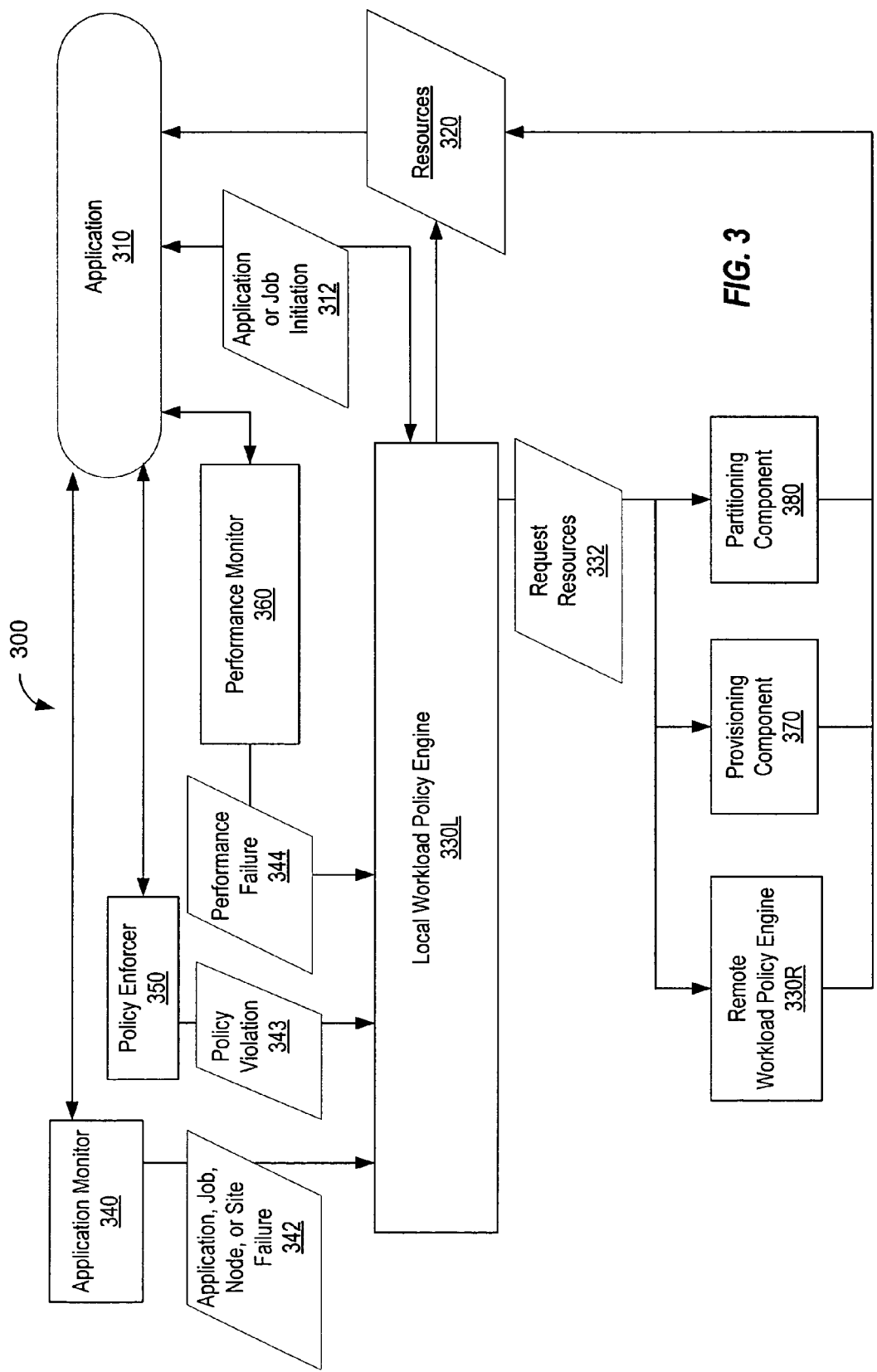
FIG. 3 shows data flows through one embodiment of a system for managing information technology process workflow in a data center.

FIG. 3 shows data flows through one embodiment of a system 300 for managing information technology process workflow in a data center. An application 310 is initiated in "Application or Job Initiation" event 312. Resources 320 are allocated to application 310 by local workload policy engine 330L. In this example, two instances of a workload policy engine are shown, local workload policy engine 330L, which runs on the same node as application 310, and remote workload policy engine 330R, which runs on a remote node in another cluster. An instance of the workload policy engine, such as local workload policy engine 330L, can be considered to be a determining module, means, or instructions because the workload policy engine determines whether a resource in a cluster can be allocated to provide a quantity of the resource to an application. An instance of the workload policy engine can also be considered to be a selecting module, means, and/or instructions to select the application to be allocated the quantity of the resource from a plurality of applications in accordance with a business priority for the application.

Local workload policy engine 330L operates in conjunction with application monitor 340, policy enforcer 350, and performance monitor 360 to manage resources within the cluster. Application monitor 340 monitors application 310 to ensure that application 310 remains running and notifies local workload policy engine 330L of application, job, node, or site failure events 342. Policy enforcer 350 monitors the use of resources by application 310 to ensure that application 310 continues to follow policy. If a policy violation 343 is detected, policy enforcer 350 notifies local workload policy engine 330L. Application monitor 340 is an example of a monitoring module, means, and/or instructions to monitor performance of a plurality of applications running in a cluster. If performance of one application fails to satisfy a criterion, application monitor 340 can notify local workload policy engine 330L, which can request to allocate a second quantity of the resource for the one application to enable the performance of the one application to satisfy the criterion.

Local workload policy engine 330L also operates in conjunction with external systems, such as performance monitor 360, provisioning component 370, and partitioning component 380. One of skill in the art will recognize that the organization of system 300 into local components, such as local workload policy engine 330L, as distinguished from external systems such as performance monitor 360, provisioning component 370, and partitioning component 380, is but one embodiment of the system. Part or all of the functionality provided by these external systems may be performed by local workload policy engine 330L, and some of the functionality of local workload policy engine 330L, application monitor 340, and policy enforcer 350 may be provided by external systems in alternative embodiments.

Performance monitor 360 notifies local workload policy engine 330L of performance failure events 344. If local workload policy engine 330L finds sufficient resources for application 310 within a cluster, local workload policy engine 330L allocates resources 320 directly to application 310.

If sufficient resources are not available within the cluster, local workload policy engine 330L can request resources from other components, as shown with request resources event 332. These other components can be external to the cluster as shown, such as remote workload policy engine 330R, provisioning component 370, and partitioning component 380. Each of remote workload policy engine 330R, provisioning component 370, and partitioning component 380 can provide resources 320 to application 310. Alternatively, provisioning component 370 and partitioning component 380 can notify local workload policy engine 330L of the resources available to allocate, and local workload policy engine 330L can provide resources 320 to application 310. Provisioning component 370 and partitioning component 380 are examples of an enabling module, means, and/or instructions that enable a cluster to provide a quantity of the resource to the application by reconfiguring the cluster. Provisioning component 370 is an example of an adding module, means, or instructions to add a quantity of the resource to reconfigure the cluster. Partitioning component 380 is an example of a partitioning module, means, and/or instructions because partitioning component 380 reconfigures the cluster by partitioning a resource within the cluster. Remote workload policy engine 330R is an example of a restarting module, means, or instructions that restart the application in a second cluster having a sufficient amount of the resource to provide the needed quantity of the resource to the application.

The workload policy engine of the present invention can be integrated with other systems or components to provide an enterprise-wide view of resource availability. For example, most major operating systems have a corresponding resource manager, such as Solaris resource manager, HP Process Resource Manager and AIX Resource manager. These resource managers, collectively called xRM herein, allow an administrator to control CPU and memory utilization. However, typically xRM packages are only aware of the system on which the xRM package is running, and not of other systems within the cluster. Preferably, the workload policy engine is integrated with xRM packages and controls resource utilization, and therefore load, on all systems in the cluster.

Figure 4:
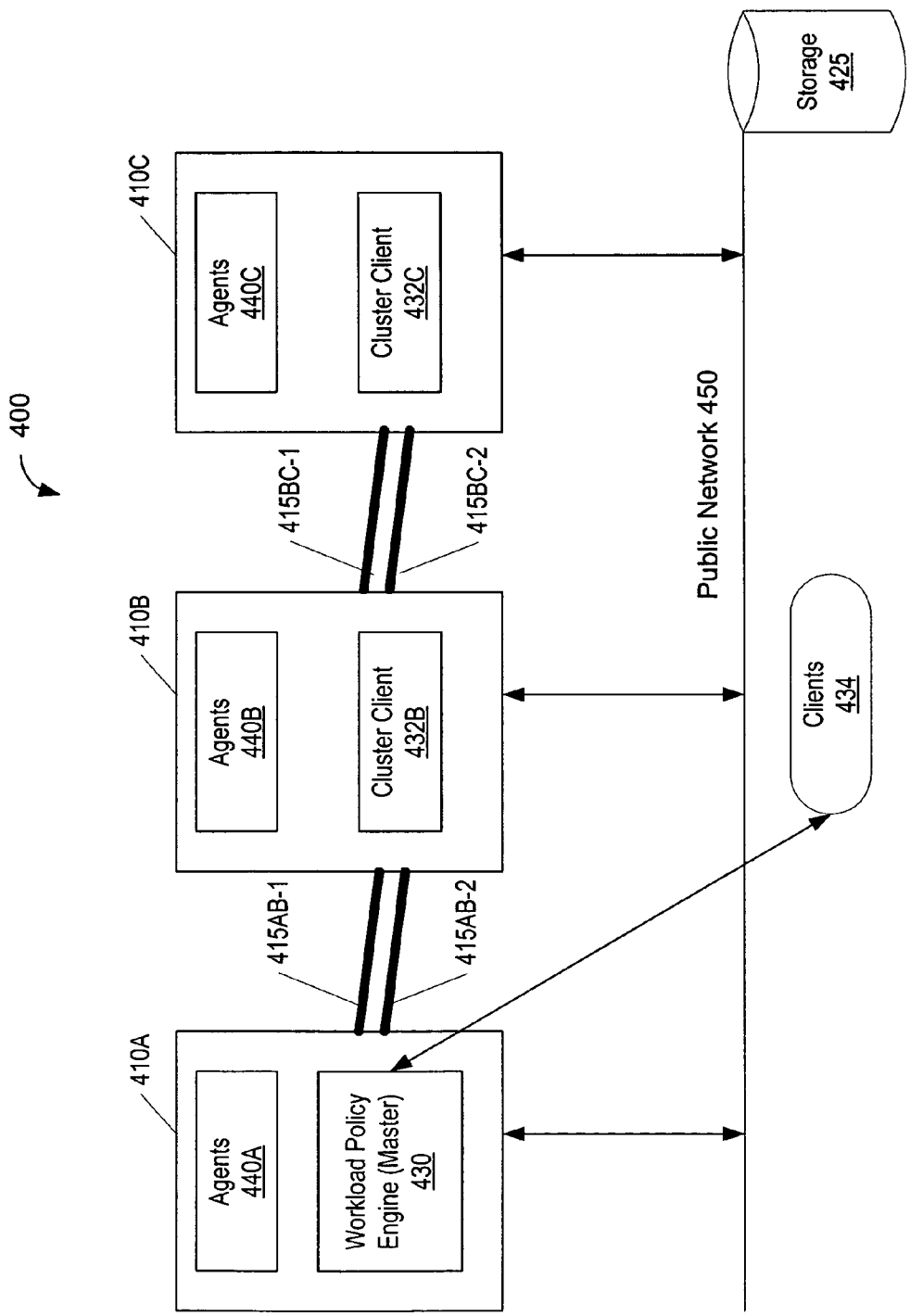
FIG. 4 shows one embodiment of the cluster of the system of FIG. 3.

FIG. 4 shows one embodiment of a cluster of the system of FIG. 3. Nodes in cluster 400 include nodes 410A, 410B, and 410C, connected via private redundant network connections 415AB-1, 415AB-2, 415BC-1, and 415BC-2, which may use a proprietary cluster protocol for communication within the cluster. Nodes 410A, 410B, and 410C share storage 425. Node 410A hosts workload policy engine (master) 430, which makes policy decisions about allocation of resources throughout cluster 400. Workload policy engine (master) 430 can be run on one node within cluster 400, but can be failed over to other nodes that share the private network. Typically, only one instance of the workload policy engine (master) is active at one time in a cluster. Each of nodes 410B and 410C hosts a respective cluster client 432B and 432C, respectively. Workload policy engine (master) 430 can receive requests from clients 434, which may include a graphical user interface, a command line interface used by an administrator, a command line interface used by an administrator, or another application via an application programming interface (API) call. Agents 440A, 440B, and 440C running on nodes 410A, 410B, and 410C, respectively, may perform the functionality of application monitor 340, policy enforcer 350, and/or performance monitor 360 of FIG. 3.

Figure 5:
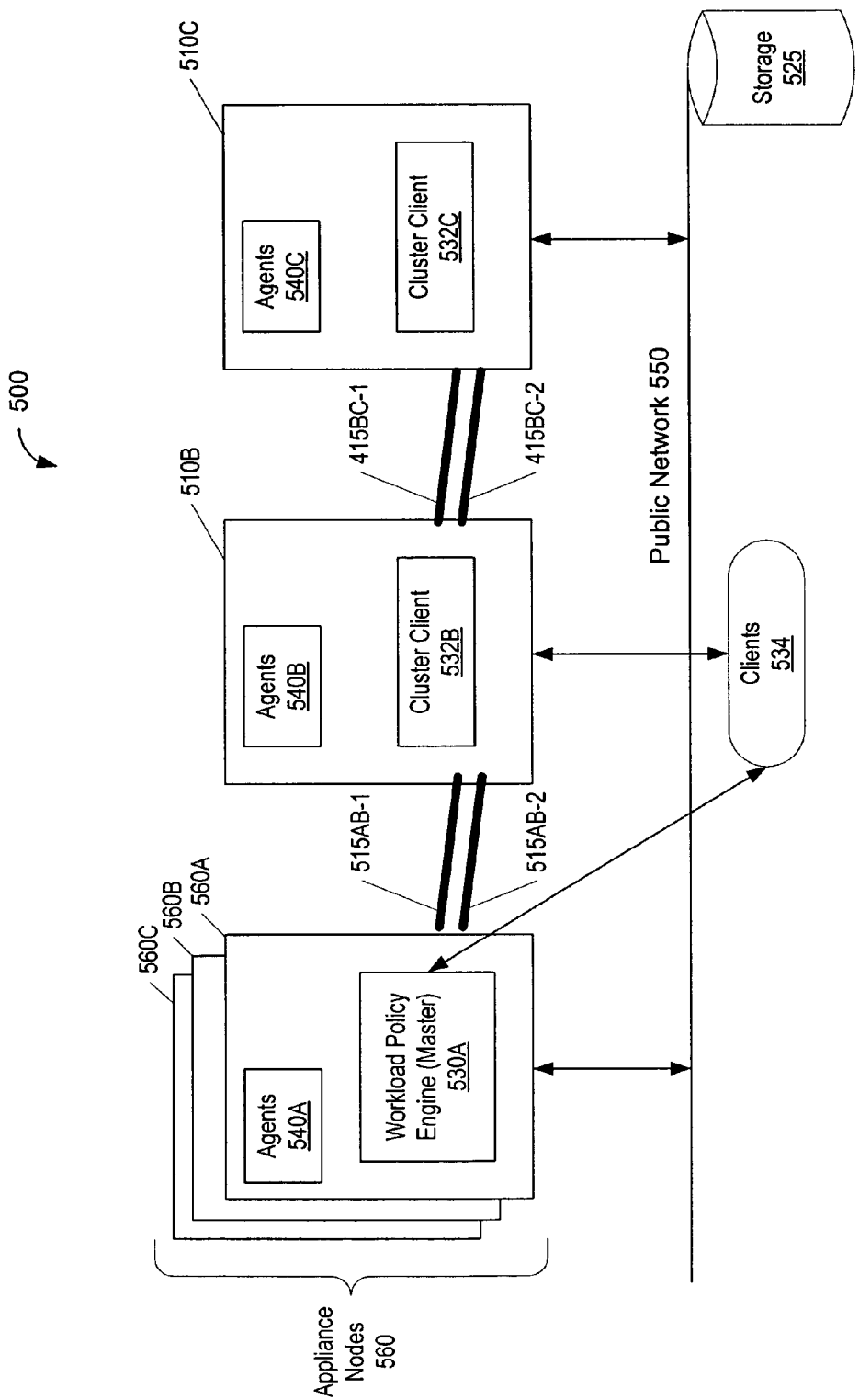
FIG. 5 shows one embodiment of a cluster appliance for managing information technology process workflow in a data center.

FIG. 5 shows one embodiment of a cluster appliance for managing information technology process workflow in a data center. Nodes in cluster 500 include appliance nodes 560 (including individual appliance nodes 560A, 560B, and 560C) and cluster nodes 510B and 510C. Each appliance node 560A, 560B, and 560C is capable of running an instance of a workload policy engine (master), such as workload policy engine (master) 530A. Typically an appliance node runs only the instance of the workload policy engine (master) so that all system resources can be dedicated to workload policy management. Appliance nodes 560 and cluster node 510B are connected via private network connections 515AB-1 and 515AB-2. Node 510C is connected to the cluster only via public network 550. Addition of a "loosely coupled" node such as node 510C enables the cluster to be extended beyond the realm of the private network. Larger clusters can be formed, and no cluster overhead is necessary for loosely coupled nodes.

Each of nodes 510B and 510C hosts a respective cluster client 532B and 532C. Workload policy engine (master) 530A can receive requests from clients 534, which may include a graphical user interface, a command line interface used by an administrator, a command line interface used by an administrator, or another application via an application programming interface (API) call. Agents 540A, 540B, and 540C running on nodes 510A, 510B, and 510C, respectively, may perform the functionality of application monitor 340, policy enforcer 350, and/or performance monitor 360 of FIG. 3.

Figure 6:
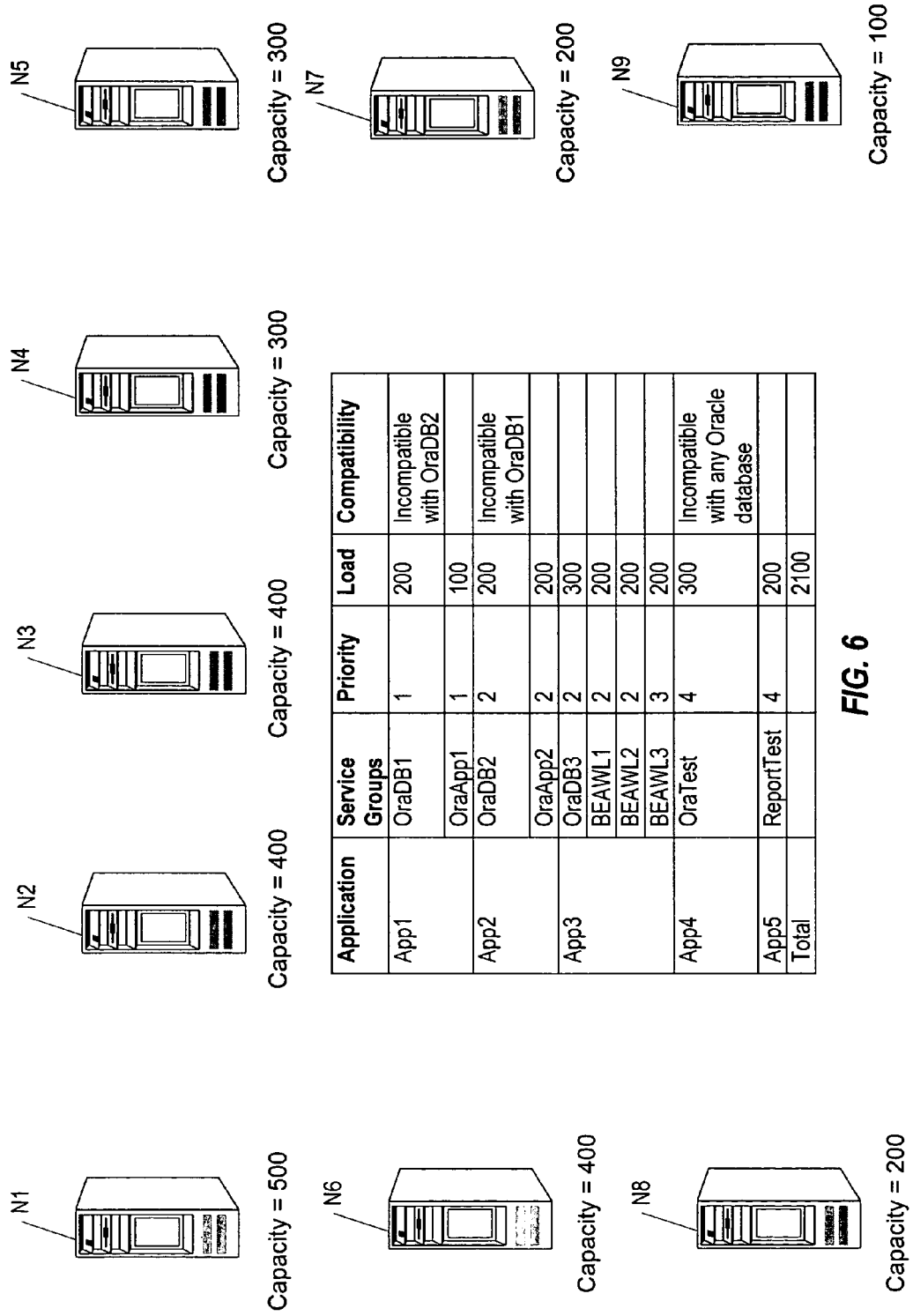
FIG. 6 shows an example of an environment with multiple servers, applications, and service groups within the applications.

FIG. 6 shows an example of an environment with multiple servers, applications, and service groups within the applications. The terms "service group," "application service group," and "application group" are used interchangeably herein to refer to a collection of dependent resources including an application, networking, and storage resources needed to provide a particular functionality, sometimes referred to as a service, to clients. In this scenario, we assume multiple applications with varying load requirements running within a cluster containing multiple machines with varying capacities. Nodes N1 through N9 have respective capacities, as shown.

Five applications are running within the cluster, named App1 through App5. Some applications include multiple service groups; for example, App2 includes service groups OraDB2 and OraApp2. Each service group has an assigned business priority and load. Service groups of an application may be dependent upon one another; for example, it is possible to have applications that run only if all service groups can be run on a node, although no such service group dependencies are shown in FIG. 6. Some applications are incompatible with each other. For example, OraDB1 and OraDB2 are incompatible and cannot be run on the same node at the same time.

While the total capacity of nodes N1 through N9 is 2800, the application load currently running in the cluster is only 2100, leaving excess capacity of 700. The workload policy engine of the present invention attempts to use excess capacity before shutting down any application. For this scenario, assume that all application service groups can run on all machines, although it is possible to configure some applications to run on only some machines. An objective of the workload policy engine is to ensure that high priority applications are continuously available.

Figure 7A:
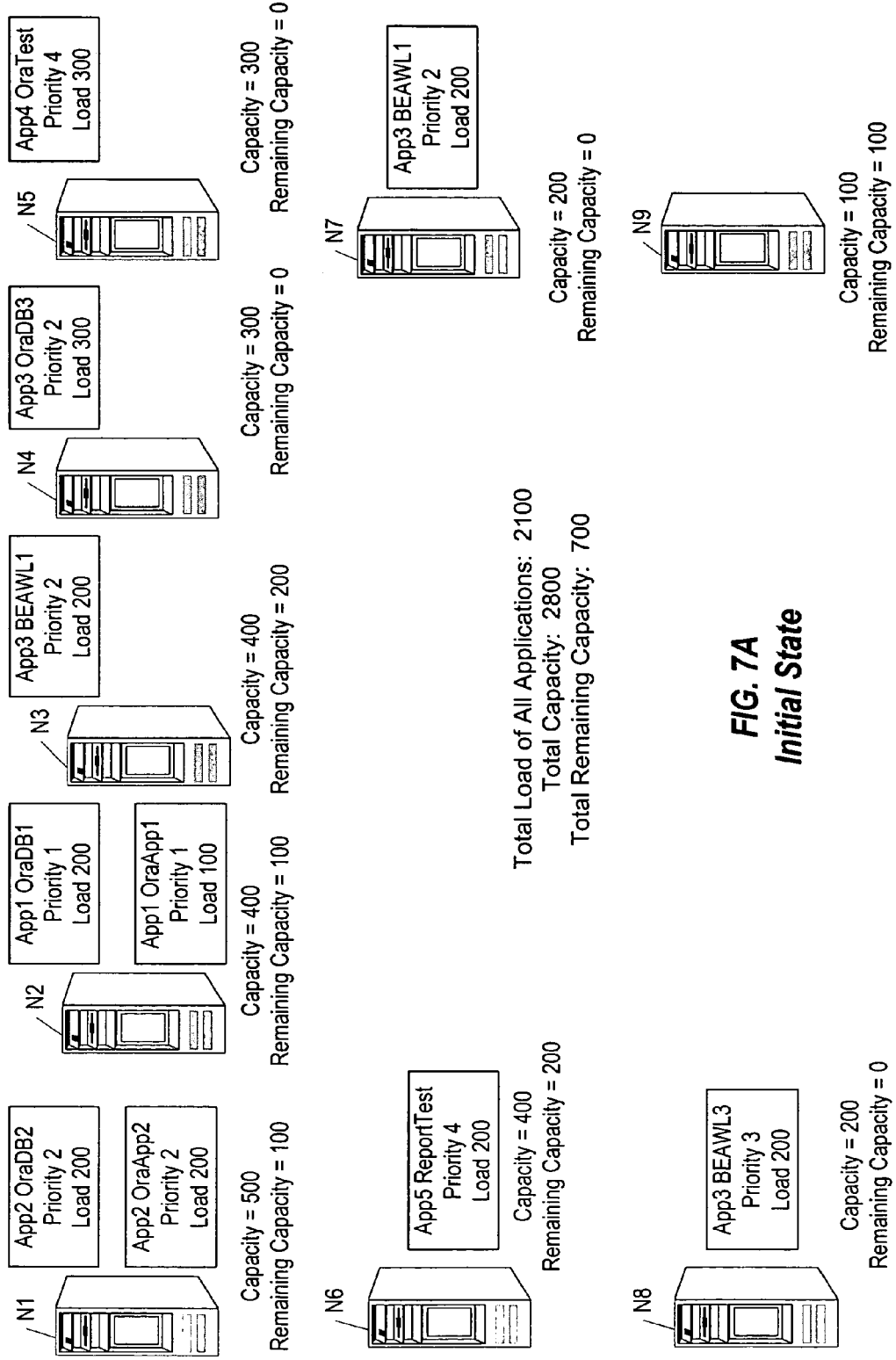

FIGS. 7A through 7D show an example allocation of resources in the environment of FIG. 6. FIG. 7A shows an initial state of the environment of FIG. 6. Each of the application service groups of FIG. 6 is shown running on a respective node. Node N9 is not running an application service group and has a capacity of 100.

Figure 7B:
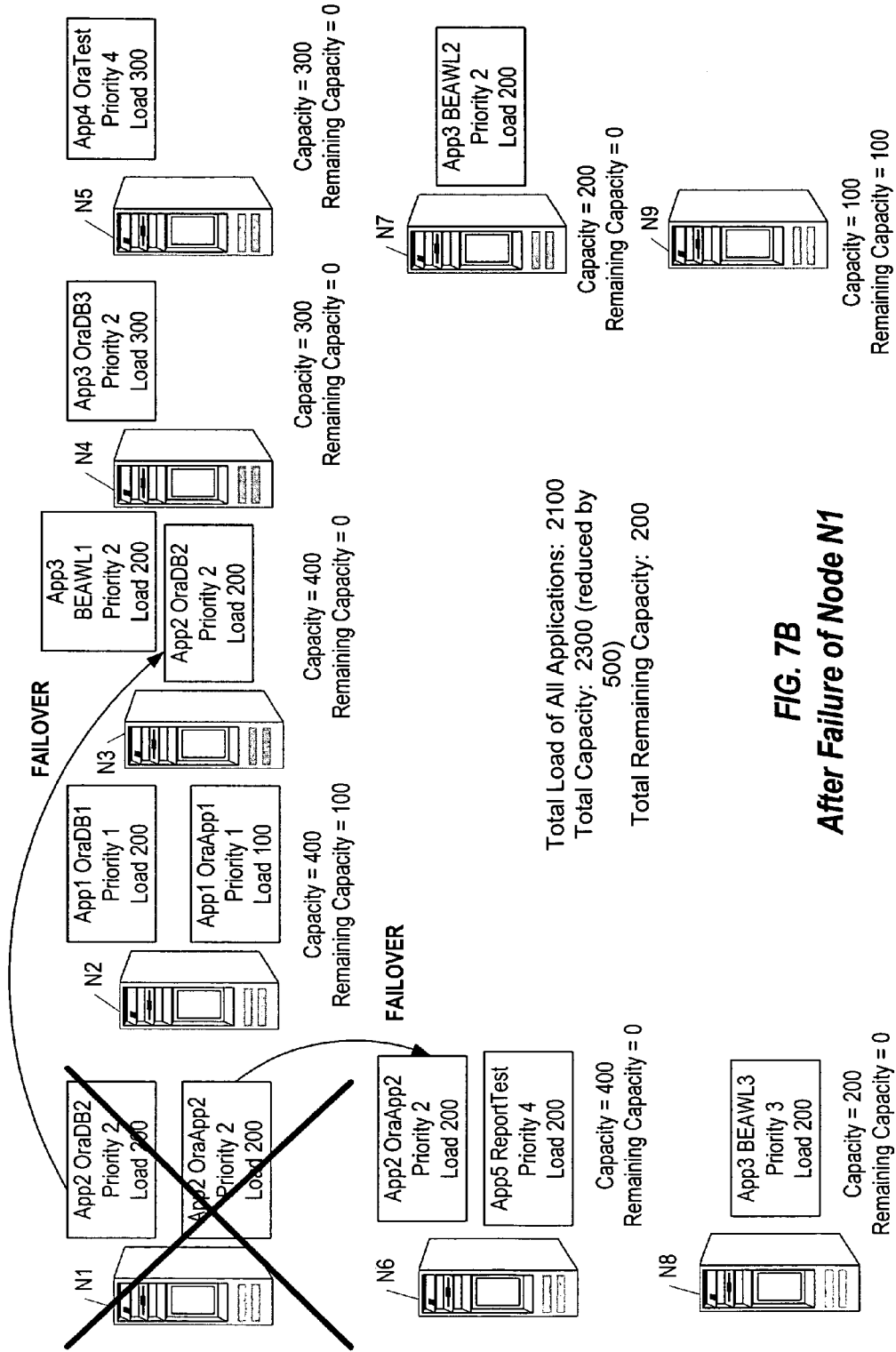

FIG. 7B shows a state following failure of node N1 of FIG. 7A and the redistribution of applications that were previously running on the failed node. Each of the applications previously on failed node N1 is a priority 2 application having a load of 200; one of the applications, App2 OraDB2, is incompatible with another application, App1 OraDB1. As a result, node N2 cannot be considered for failover of App2 OraDB2. Furthermore; each application can only be run on a node that has remaining capacity of at least 200. As shown in FIG. 7A, only nodes N3 and N6 had remaining capacity of 200 at the time node N1 failed. Since neither node N3 or node N6 is running an incompatible application, application App2 service group OraDB2 has been failed over to node N6, and application App2 service group OraApp2 has been failed over to node N3. Each of nodes N3 and N6 now has zero remaining capacity. The total load of all applications remains 2100, but the total remaining capacity has been reduced from 700 to 200, having been reduced by the capacity of 500 previously provided by node N1.

No service group dependency was defined for App2 OraDB2 and App2 OraApp2 in the preceding example. The workload policy engine of the present invention is designed to handle application service group dependencies. Had a service group dependency been defined, App2 OraDB2 and OraApp2 may have been required to run on the same node and could not be separated. Terminating another application would have been necessary to provide the capacity of 400 required to run both applications on a single node.

Figure 7C:
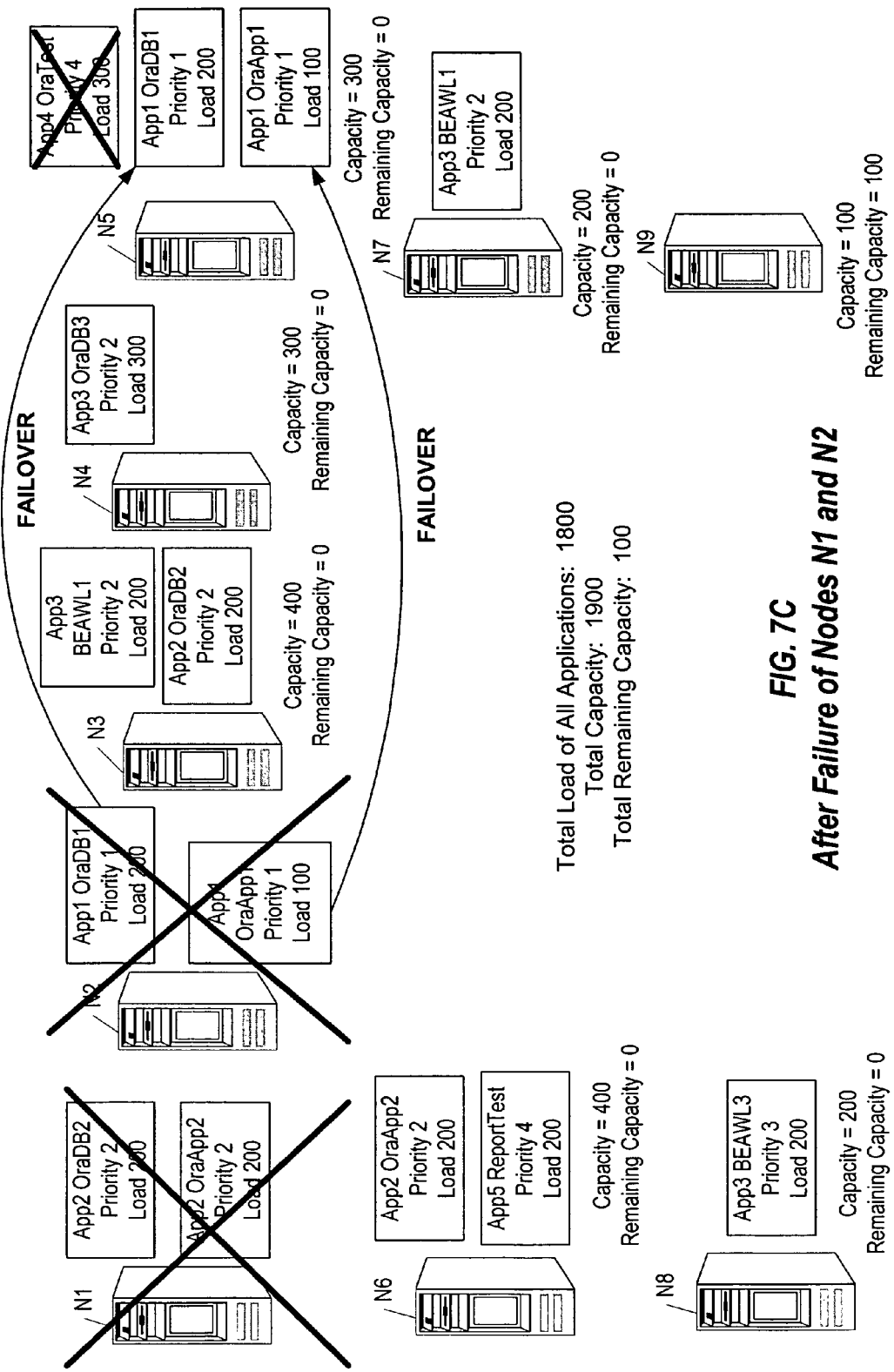

FIG. 7C shows a state following failure of a second node shown in FIG. 7B and the redistribution of applications that were previously running on each node. The applications running on node N2 were application App1 service group OraDB1, having a priority of 1 and a load of 200, and application App1 service group OraApp1, having a priority of 1 and a load of 100. Three hundred units of excess capacity must be found to run those applications within the cluster. Currently, no single node has a remaining capacity of 300, or even of the 200 capacity needed by application App1 service group OraDB1. The workload policy engine of the present invention can search for lower-priority applications to terminate so that the resources held can be used for the higher-priority applications. Under a minimum service disruption policy, workload policy engine can search for the lowest priority application providing the highest amount of capacity and terminate that application.

As shown in FIG. 7B, the lowest priority applications are application App4 service group OraTest, having a priority of 4 and a load of 300, and application App5 service group ReportTest, having a priority of 4 and a load of 200. Application App4 service group OraTest provides the largest quantity of resources and is selected for termination. Terminating application App4 service group OraTest frees a capacity of 300 on node N5. Application App1 service group OraDB1, having a load of 200, and application App1 service group OraApp1, having a load of 100, can then be failed over to node N5. The total load of all applications has been reduced from 2100 to 1800 by terminating application App4 service group OraTest. The failure of node N2 reduces the remaining capacity in the cluster to only 100.

FIG. 7D shows a state following the addition of a server to the environment of FIG. 7C. Node N10, having a capacity of 300, has been added. Adding node N10 reconfigures the cluster so that application App4 service group OraTest can be restarted. The total load of all applications in the cluster increases to 2100, and the total remaining capacity in the cluster remains at 100.

Figure 8A:
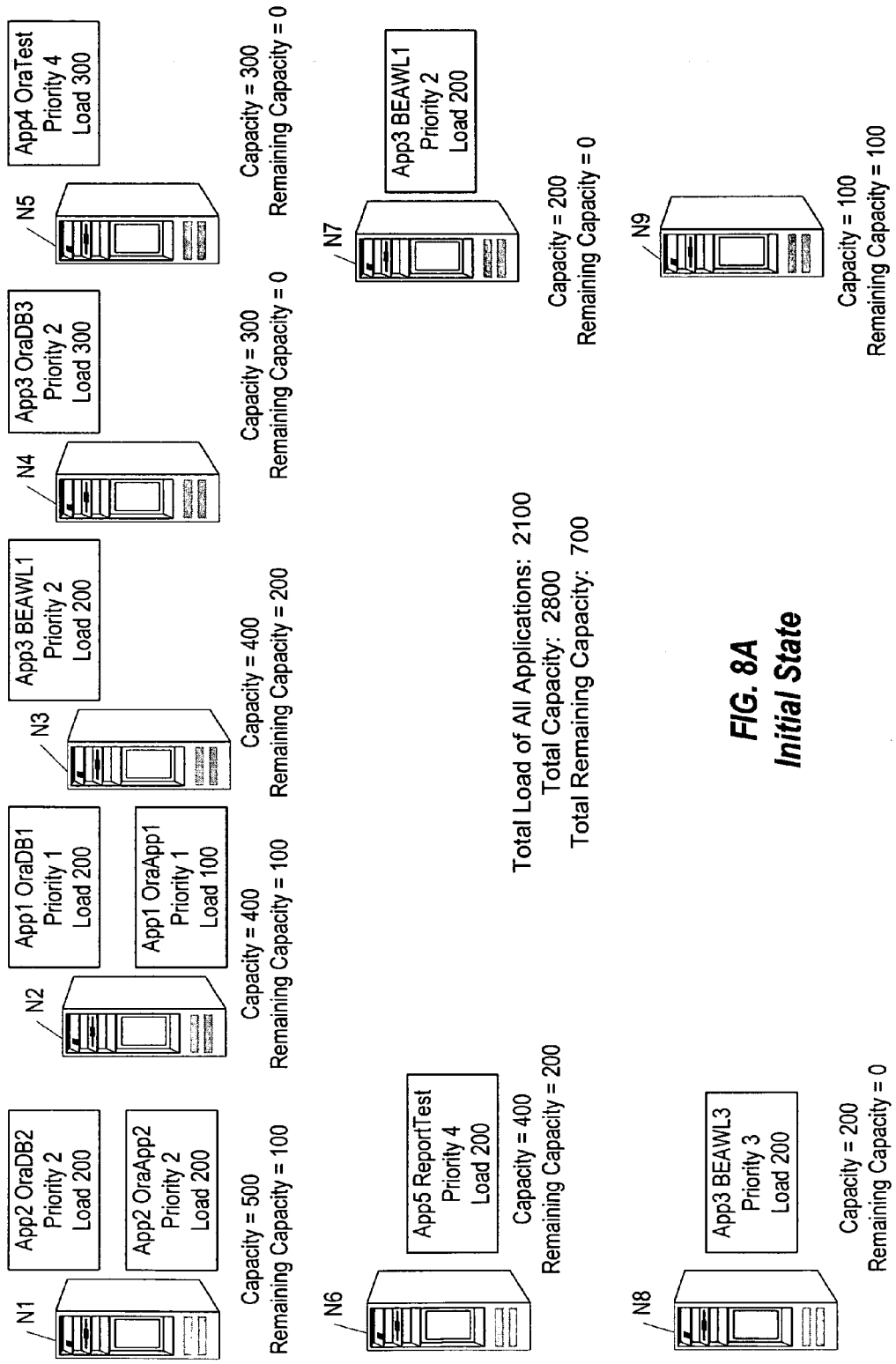
FIGS. 8A through 8D show another example allocation of resources in the environment of FIG. 6.

FIGS. 8A through 8D show another example allocation of resources in the environment of FIG. 6. FIG. 8A shows another initial state of the environment of FIG. 6. Each of the application service groups of FIG. 6 is shown running on a respective node. Node N9 is not running an application service group and has a capacity of 100.

Figure 8B:
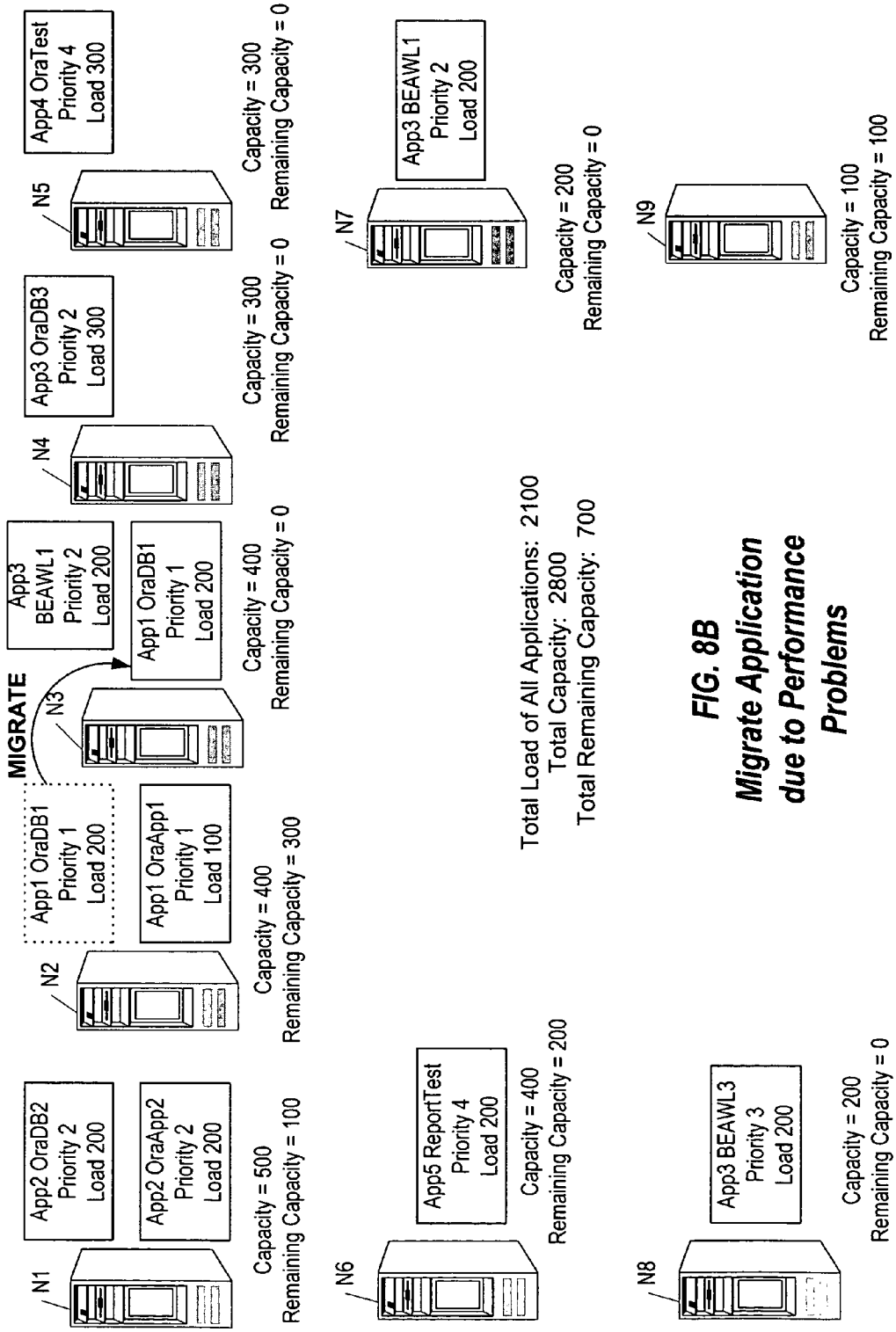

FIG. 8B shows a state following migration of an application from one node to another in FIG. 8A for performance reasons. Application App1 service group OraDB1, having a priority of 1 and a load of 200, has been migrated from node N2 to node N3. Node N3 remaining capacity reduces to zero, and node N2 remaining capacity increases to 300. Total load of all applications remains at 2100 and total remaining capacity in the cluster remains at 700.

It is possible, in some embodiments, to increase the load of an application when it is migrated for performance reasons to ensure that the application is allocated additional resources. Alternatively, load of an application can be increased in response to performance failure or policy violations if necessary after the application is migrated.

Figure 8C:
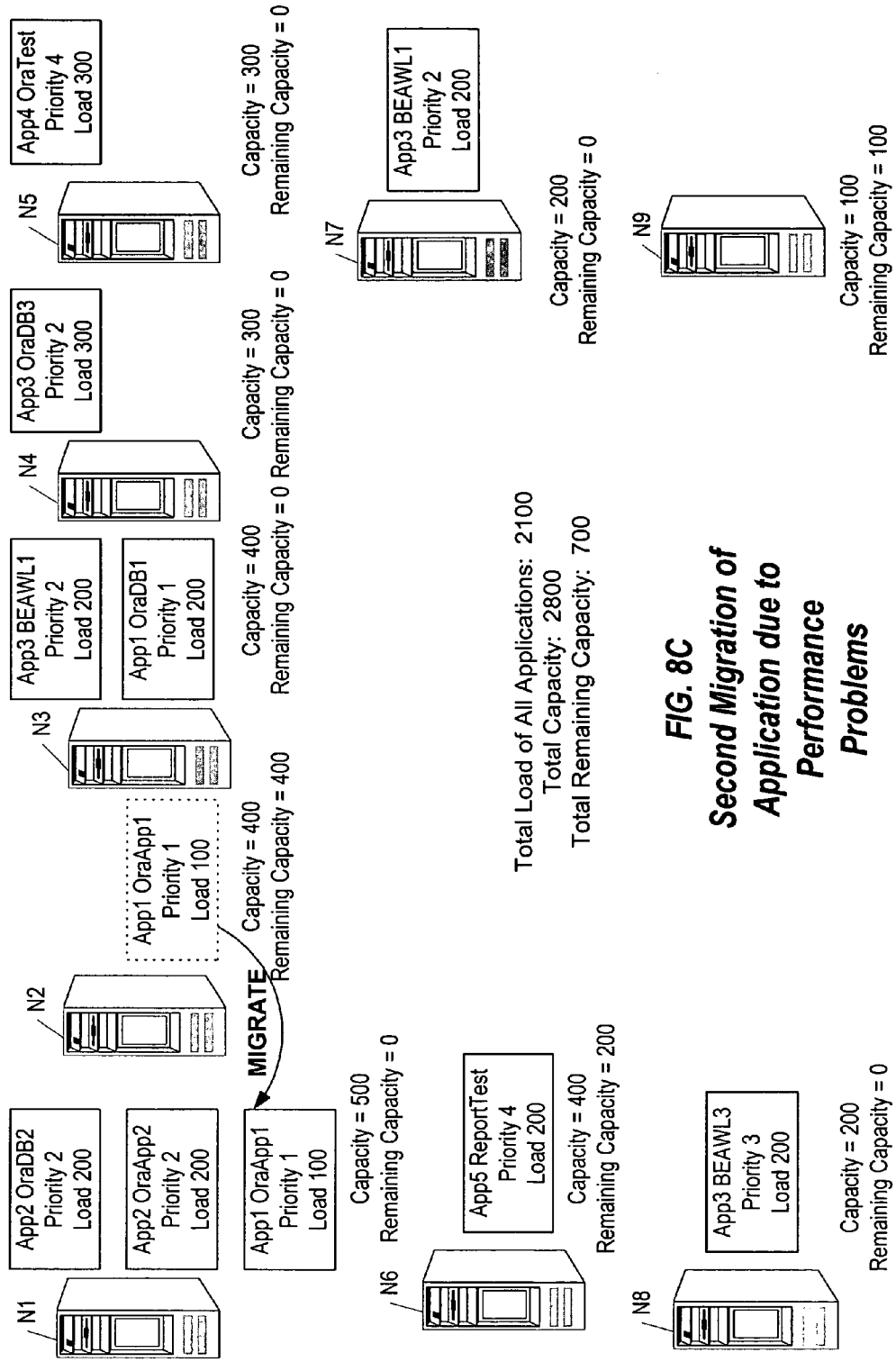

FIG. 8C shows a state following migration of another application from the same node as in FIG. 8B for performance reasons. Application App1 service group OraApp1, having a priority of 1 and a load of 100, has been migrated from node N2 to node N1. Node N1 remaining capacity reduces to zero, and node N2 remaining capacity increases to 400. Total load of all applications remains at 2100 and total remaining capacity in the cluster remains at 700. However, when all applications are removed from a node, policy can dictate that the node be shut down to remedy the reasons the node had performance problems.

Figure 8D:
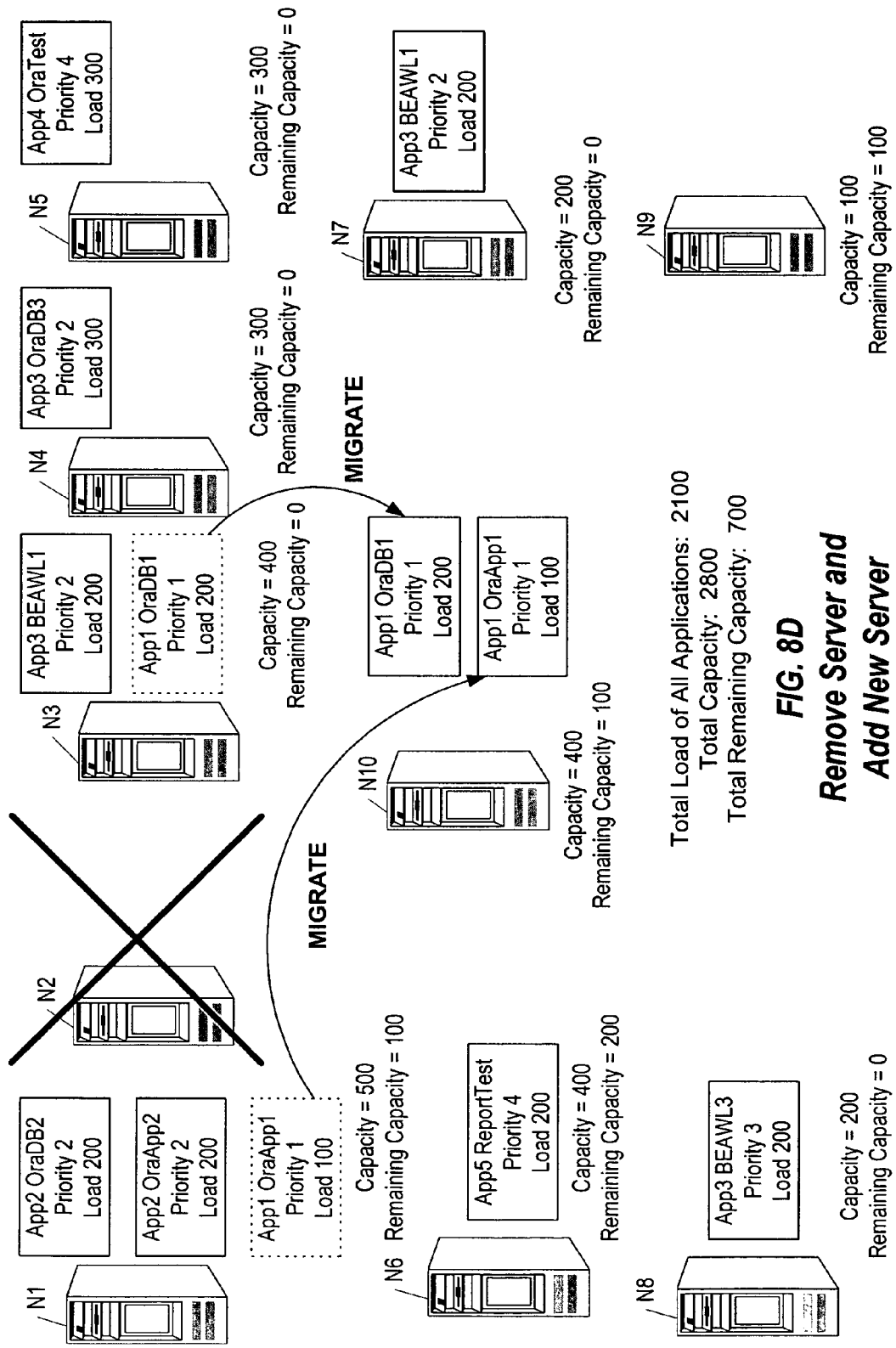

FIG. 8D shows a state following removal of node N2 and after addition of a server node N10 to the environment of FIG. 8C. The two application service groups previously running on node N2, application App1 service groups OraApp1 and OraDB1, are migrated to the new node N10. N1 remaining capacity increases to 100, and node N3 remaining capacity increases to 200. Total load of all applications remains at 2100 and total remaining capacity in the cluster remains at 700.

Figure 9A:
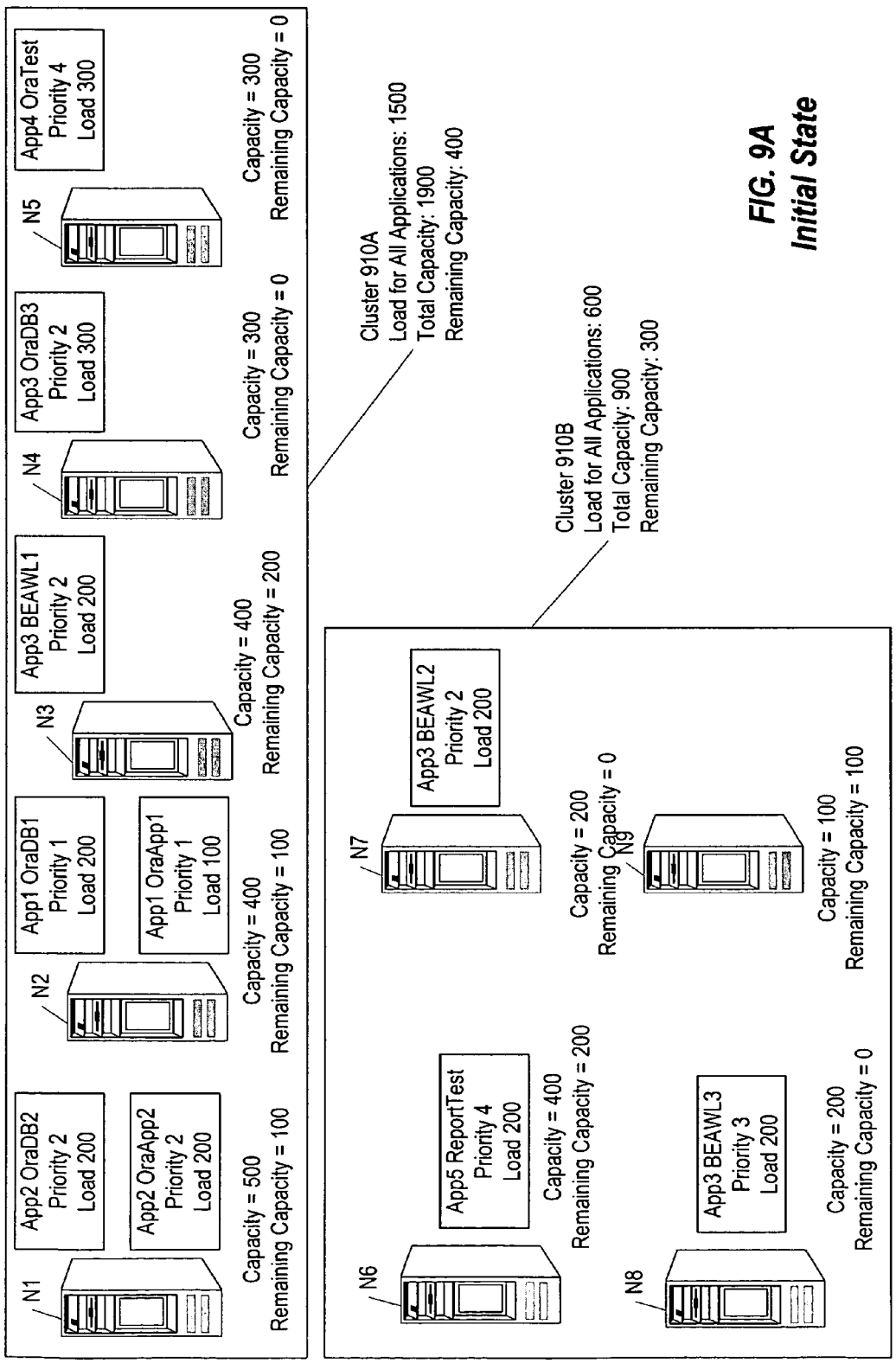
FIG. 9A shows an initial state of the environment of FIG. 6 with two clusters.

FIG. 9A shows an initial state of the environment of FIG. 6 with two clusters, clusters 910A and 910B. Cluster 910A has a total capacity of 1900, a load of 1500, and remaining capacity of 400. Cluster 910B has a total capacity of 900, a load of 600, and a remaining capacity of 300.

Figure 9B:
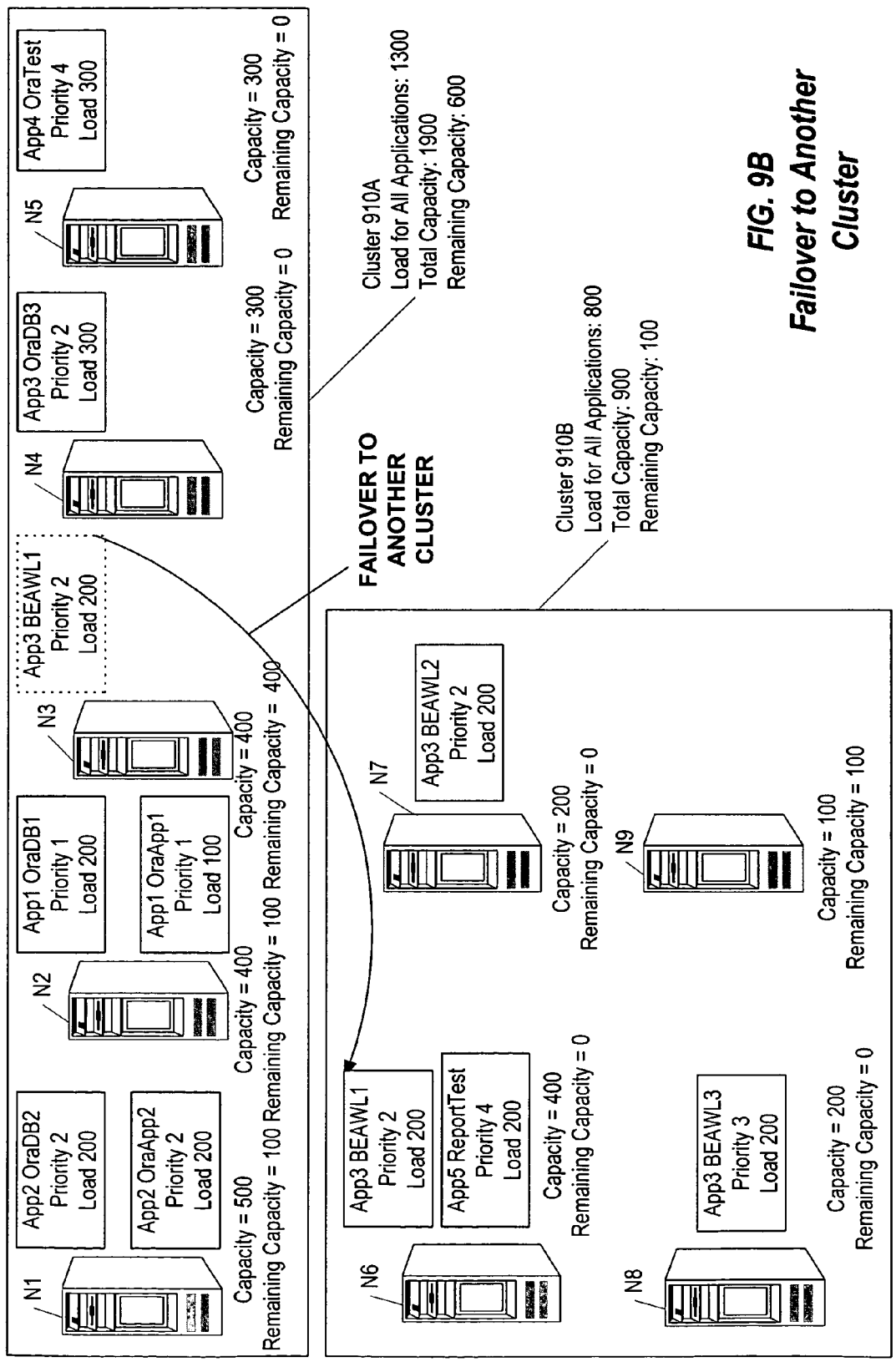
FIG. 9B shows a state following failover of an application from one of the two clusters of FIG. 9A to the other.

FIG. 9B shows a state following failover of an application from one of the two clusters of FIG. 9A to the other. Application App3 service group BEAWL1, having a priority of 2 and a load of 200, is failed over from node N3 in cluster 910A to node N6 in cluster 910B. This failover increases the remaining capacity of node N3 in cluster 910A to 400, decreases the load of node N3 to 0, decreases the remaining capacity of node N6 in cluster 910B to 0, and increases the load of node N6 to 400. As a result, cluster 910A now has a total capacity of 1900 (assuming that node N3 remains up since no applications are currently running), load of 1300, and remaining capacity of 600. Cluster 910B now has a total capacity of 900, load of 800, and remaining capacity of 100.

Figure 10A:
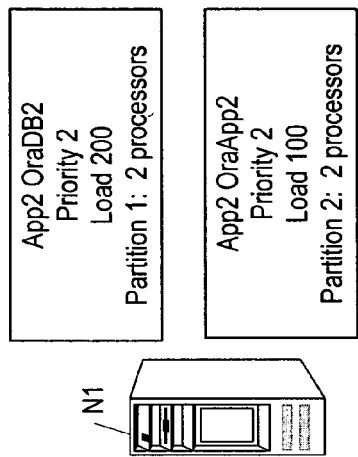
FIG. 10A shows an example of allocation of processors between two applications running on a single node.

FIG. 10A shows allocation of processors between two applications running on a single node. Applications are shown running in two partitions, partition 1 and partition 2. Running in partition 1 is application App2 OraDB2, with a priority of 2 and a load of 200. Running in partition 2 is application App2 OraApp2, which also has a priority of 1 and a load of 100. Assume that performance of application App2 OraDB2 begins to suffer and the workload policy engine requests additional resources.

Figure 10B:
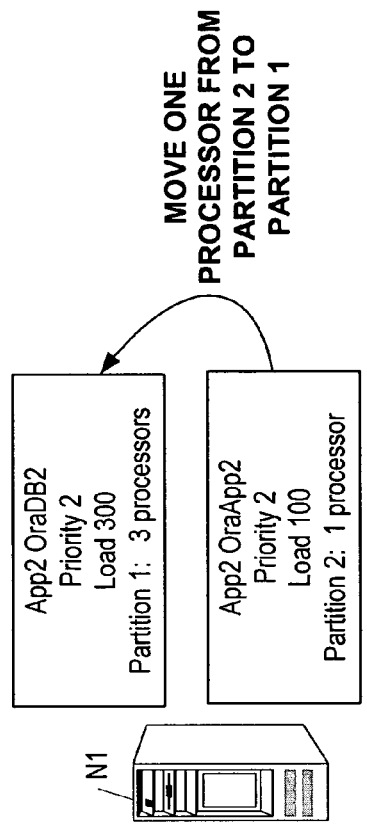
FIG. 10B shows the processors of FIG. 10A after re-partitioning the node.

FIG. 10B shows the processors of FIG. 10A after re-partitioning the node. One processor has been moved from partition 2 to partition 1, providing three processors in partition 1 for application App2 OraDB2 and leaving only one processor for application App2 OraApp2. The load of App2 OraDB2 has been increased to 300. Because the load of 100 for App2 OraApp2 can be handled by only one processor, App2 OraApp2 continues to run.

FIG. 11A shows another example of allocation of processors between two applications running on a single node. In this example, App2 OraDB2 is a priority 1 application with a load of 200 running in partition 1, which has two processors. App2 OraApp2 is a priority 2 application with a load of 200 running in partition 2, which also has two processors.

FIG. 11B shows the processors of FIG. 11A after re-partitioning the node and terminating one of the applications. One processor has been moved from partition 2 to partition 1, providing three processors in partition 1 for the higher priority application App2 OraDB2 and leaving only one processor for the lower priority application App2 OraApp2. The load of App2 OraDB2 has been increased to 300. Because the load of 200 for App2 OraApp2 cannot be handled by only one processor, App2 OraApp2 must be terminated.

The present invention provides many advantages. Information technology resources are managed in accordance with business priorities. Application needs for availability, disaster recovery, and performance are taken into account when allocating resources. When an application is started, restarted upon failure, or moved due to an overload situation, resources best fulfilling the requirements for running the application are allocated to the application. Respective priorities of applications can be used to determine whether a lower-priority application can be moved to free resources for running a higher-priority application. Resources can be dynamically added to a cluster or partitioned to meet changing needs of the application environment. An application can be failed over from one cluster to another in order to maintain continuous operation of high priority applications.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be computer-readable storage media, such as magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    determining whether a resource in a first cluster can be allocated to provide a first quantity of the resource to a first application, wherein
        the first cluster comprises
            a plurality of nodes, and
        the determining whether the resource in the first cluster can be allocated comprises
            detecting whether one or more applications, other than the first application, executing on one of the nodes are compatible with the first application, and
            detecting whether the one of the nodes can provide the first quantity of the resource;
    if the resource in the first cluster cannot be allocated to provide the first quantity of the resource to the first application, determining whether the first cluster can be reconfigured to provide the first quantity of the resource to the first application, wherein
        the determining whether the first cluster can be reconfigured comprises
            comparing a priority of at least one of the one or more applications to a priority of the first application; and
    if the first cluster can be reconfigured, enabling the first cluster to provide the first quantity of the resource to the first application by reconfiguring the first cluster; and
    if the first cluster cannot be reconfigured, restarting the first application in a second cluster having a sufficient amount of the resource to provide the first quantity of the resource to the first application.

2. The method of claim 1 further comprising:
    selecting the first application to be allocated the first quantity of the resource from a plurality of applications in accordance with a business priority for the first application, wherein the reconfiguring the first cluster comprises
        partitioning the resource within the first cluster.

3. The method of claim 2 wherein the reconfiguring the first cluster comprises:
    adding a second quantity of the resource to the first cluster.

4. The method of claim 2 further comprising:
    monitoring performance of a plurality of applications running in the first cluster; and
    if performance of one application of the plurality of applications fails to satisfy a criterion,
        requesting to allocate a second quantity of the resource for the one application to enable the performance of the one application to satisfy the criterion.

5. The method of claim 2 wherein:
    the determining whether the resource in the first cluster can be allocated to provide the first quantity of the resource to the first application is performed in response to failure of the first application.

6. The method of claim 2 wherein:
    the comparing comprises determining whether each of the one or more applications can be run at the same time as the first application and on the same node as the first application, and
    the determining whether the resource in the first cluster can be allocated to provide the first quantity of the resource to the first application is performed in response to starting the first application.

7. The method of claim 2 wherein:
    the determining whether the resource in the first cluster can be allocated to provide the first quantity of the resource to the first application is performed in response to identifying a problem with performance of the first application.

8. The method of claim 2 wherein:
    the determining whether the resource in the first cluster can be allocated to provide the first quantity of the resource to the first application is performed in response to determining that the first application is not in conformance with a policy.

9. The method of claim 1, wherein the first cluster comprises a plurality of nodes, wherein:
    at least one node among the plurality of nodes is a multiprocessor node, and
    the reconfiguring comprises partitioning the multiprocessor node into multiple nodes.

10. The method of claim 1, wherein the determining whether the first cluster can be reconfigured comprises:
    comparing a remaining capacity of a candidate server in the first cluster to a load of the first application.

11. The method of claim 1, wherein the determining whether the first cluster can be reconfigured comprises:
    comparing a remaining capacity of a candidate server in the first cluster to a load of an application that is incompatible with the first application.

12. The method of claim 1, wherein the determining whether the first cluster can be reconfigured comprises:
  comparing a remaining capacity of a candidate server in the first cluster to a revised increased load of the first application.

13. A system comprising:
  a processor;
  an interconnect coupled to the processor; and
  a computer-readable storage medium coupled to the processor via the interconnect, the computer-readable storage medium further comprising computer-readable code, wherein when executed by the processor, the computer-readable code is configured for
    determining whether a resource in a first cluster can be allocated to provide a first quantity of the resource to a first application, wherein
      the first cluster comprises
        a plurality of nodes, and
      the determining whether the resource in the first cluster can be allocated comprises
        detecting whether one or more applications, other than the first application, executing on one of the nodes are compatible with the first application, and
        detecting whether the one of the nodes can provide the first quantity of the resource;
    determining whether the first cluster can be reconfigured to provide the first quantity of the resource to the first application, if the resource in the first cluster cannot be allocated to provide the first quantity of the resource to the first application, wherein
      the determining whether the first cluster can be reconfigured comprises
        comparing a priority of at least one of the one or more applications to a priority of the first application;
    enabling the first cluster to provide the first quantity of the resource to the first application by reconfiguring the first cluster, if the first cluster can be reconfigured; and
    restarting the first application in a second cluster having a sufficient amount of the resource to provide the first quantity of the resource to the first application, if the first cluster cannot be reconfigured.

14. The system of claim 13, wherein the computer-readable code is further configured for:
  selecting the first application to be allocated the first quantity of the resource from a plurality of applications in accordance with a business priority for the first application.

15. The system of claim 14, wherein the computer-readable code is further configured for:
  partitioning the resource within the first cluster.

16. The system of claim 14, wherein the computer-readable code is further configured for:
  monitoring performance of a plurality of applications running in the first cluster; and
  requesting to allocate a second quantity of the resource for one application of the plurality of applications if the one application fails to satisfy a criterion to enable the performance of the one application to satisfy the criterion.

17. The system of claim 13, wherein the first cluster comprises a plurality of nodes, wherein:
  at least one node among the plurality of nodes is a multi-processor node, and
  the reconfiguring comprises partitioning the multiprocessor node into multiple nodes.

18. A system comprising:
  a first determining module configured to determine whether a resource in a first cluster can be allocated to provide a first quantity of the resource to a first application, wherein
    the first cluster comprises
      a plurality of nodes, and
    the determining module is configured to determine whether the resource in the first cluster can be allocated by
      detecting whether one or more applications, other than the first application, executing on one of the nodes are compatible with the first application, and
      detecting whether the one of the nodes can provide the first quantity of the resource;
  a second determining module configured to determine whether the first cluster can be reconfigured to provide the first quantity of the resource to the first application, if the resource in the first cluster cannot be allocated to provide the first quantity of the resource to the first application, wherein
    the second determining module is configured to determine whether the first cluster can be reconfigured comprises
      comparing a priority of at least one of the one or more applications to a priority of the first application;
  an enabling module configured to enable the first cluster to provide the first quantity of the resource to the first application by reconfiguring the first cluster, if the first cluster can be reconfigured;
  a restarting module configured to restart the first application in a second cluster having a sufficient amount of the resource to provide the first quantity of the resource to the first application, if the first cluster cannot be reconfigured; and
  communications hardware configured to enable communication between the first and second clusters.

19. The system of claim 18, further comprising:
  a selecting module configured to select the first application to be allocated the first quantity of the resource from a plurality of applications in accordance with a business priority for the first application.

20. The system of claim 19, further comprising:
  an adding module configured to add a second quantity of the resource to the first cluster.

21. The system of claim 19, further comprising:
  a partitioning module configured to partition the resource within the first cluster.

22. The system of claim 19 further comprising:
  a monitoring module configured to monitor performance of a plurality of applications running in the first cluster; and
  a requesting module configured to request to allocate a second quantity of the resource for one application to enable the performance of the one application to satisfy a criterion.

23. The system of claim 18, wherein the first cluster comprises a plurality of nodes, wherein:
  at least one node among the plurality of nodes is a multi-processor node, and
  the reconfiguring comprises partitioning the multiprocessor node into multiple nodes.

24. A computer-readable storage medium comprising:
  determining instructions configured to determine whether a resource in a first cluster can be allocated to provide a first quantity of the resource to a first application, wherein the first cluster comprises
a plurality of nodes, and
the determining instructions configured to determine whether the resource in the first cluster can be allocated comprises
detecting instructions configured to detect whether one or more applications, other than the first application, executing on one of the nodes are compatible with the first application, and
detecting instructions configured to detect whether the one of the nodes can provide the first quantity of the resource;
determining instructions configured to determine whether the first cluster can be reconfigured to provide the first quantity of the resource to the first application, if the resource in the first cluster cannot be allocated to provide the first quantity of the resource to the first application, wherein
the determining instructions configured to determine whether the first cluster can be reconfigured are further configured to compare a priority of at least one of the one or more applications to a priority of the first application;
enabling instructions configured to enable the first cluster to provide the first quantity of the resource to the first application by reconfiguring the first cluster, if the first cluster can be reconfigured; and
restarting instructions configured to restart the first application in a second cluster having a sufficient amount of the resource to provide the first quantity of the resource to the first application, if the first cluster cannot be reconfigured.

25. A computer-readable storage medium of claim 24 further comprising:
selecting instructions configured to select the first application to be allocated the first quantity of the resource from a plurality of applications in accordance with a business priority for the first application.

26. A computer-readable storage medium of claim 25 further comprising:
adding instructions configured to add a second quantity of the resource to the first cluster.

27. A computer-readable storage medium of claim 25 further comprising:
partitioning instructions configured to partition the resource within the first cluster.

28. A computer-readable storage medium of claim 25 further comprising:
monitoring instructions configured to monitor performance of a plurality of applications running in the first cluster; and
requesting instructions configured to request to allocate a second quantity of the resource for one application to enable the performance of the one application to satisfy a criterion.

29. The computer-readable storage medium of claim 24, wherein the first cluster comprises a plurality of nodes, wherein:
at least one node among the plurality of nodes is a multiprocessor node, and
the reconfiguring comprises partitioning the multiprocessor node into multiple nodes.

\* \* \* \* \*